United States Patent Office 3,464,983
Patented Sept. 2, 1969

3,464,983
4H-BENZO[4,5]CYCLOHEPTA[1,2-b]THIOPHENES
Ernst Jucker, Ettingen, Anton Ebnother, Reinach, Basel-Land, Jean-Michel Bastian, Birsfelden, Erwin Rissi, Basel, and André Stoll, Birsfelden, Switzerland, assignors to Sandoz Ltd. (also known as Sandoz A.G.), Basel, Switzerland
No Drawing. Continuation-in-part of applications Ser. No. 428,197, Jan. 26, 1965, Ser. No. 441,348, Mar. 19, 1965, Ser. No. 476,169 and Ser. No. 476,197, July 30, 1965, and Ser. No. 487,030, Sept. 13, 1965. This application May 31, 1967, Ser. No. 642,295
Claims priority, application Switzerland, Feb. 4, 1964, 1,275/64; Apr. 2, 1964, 4,264/64; Aug. 11, 1964, 10,467/64, 10,468/64; Oct. 13, 1964, 13,246/64; Jan. 21, 1965, 875/65; June 9, 1965, 8,061/65, 8,062/65, 8,063/65, 8,064/65
The portion of the term of the patent subsequent to Sept. 13, 1983, has been disclaimed
Int. Cl. C07d 63/18, 99/06; A61k 27/00
U.S. Cl. 260—240
42 Claims

ABSTRACT OF THE DISCLOSURE

New compounds which contain the 4H-benzo[4,5]cyclohepta[1,2-b]thiophene nucleus, of Formulas A and B:

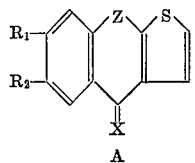
A

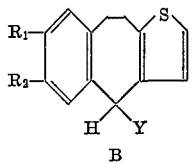
B wherein Z stands for —CH=CH— or —CH$_2$—CH$_2$— and X and Y stand for a nitrogen-containing substituent, are prepared.

The compounds are anti-depressants and are useful to produce a potentiation of the effect of noradrenalin and certain sedative and anti-cholinergic effects. The compounds are of low toxicity and are suitable for the treatment of neurotic and psychotic disorders and also for the therapeutic treatment of phychosomatic disorders, The compounds are suitable for administration in the form of their physiologically acceptable, water-soluble salts.

---

This invention is a continuation-in-part of the following applications, Ser. Nos. 428,197, filed Jan 26, 1965; 441,348, filed Mar. 19, 1965; 476,197, filed July 30, 1965; 476,169, filed July 30, 1965; and 487,030, filed Sept. 13, 1965, all now abandoned.

This invention relates to 4H-benzo[4,5]cyclohepta[1, 2-b]thiophene derivatives and more specifically to compounds of Formuas A and B below and to the methods for their preparation.

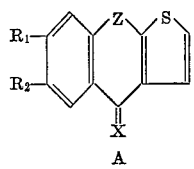
A

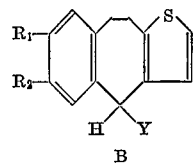
B

Z in the formula above is a member of the group consisting of —CH$_2$—CH$_2$— and —CH=CH— and each of R$_1$ and R$_2$ is a member selected from the group consisting of hydrogen, chlorine and bromine and X and Y are nitrogenous basic substituents. The invention also relates to the physiologically acceptable salts of the nitrogenous bases described herein.

The invention is also characterized by the fact that only one of R$_1$ and R$_2$ may be halogen, e.g. chlorine or bromine, and that when either R$_1$ or R$_2$ is halogen, the other is hydrogen.

According to one embodiment of the compounds of Formula A above, X is a nitrogen-substituted pyrrolidinyl group and Z is —CH$_2$—CH$_2$— and then the compounds A more specifically have Formula I below:

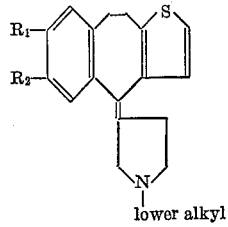
I wherein the alkyl group attached to the nitrogen atom is a lower alkyl containing between 1 and 4 carbon atoms and R$_1$ and R$_2$ have the same meaning as indicated above.

According to another embodiment of Formula A, above, X is:

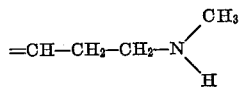

so that compounds A, more specifically have the Formula II below:

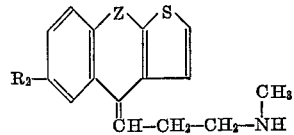
II

In the above formula, R$_2$ may be hydrogen, chlorine or bromine, and Z may be —CH=CH— or

—CH$_2$—CH$_2$—

According to another embodiment of Formula A above, X is:

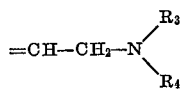

wherein R$_3$ and R$_4$ may be similar or dissimilar and each of R$_3$ and R$_4$ is a lower alkyl group of 1 to 4 carbon atoms and Z is —CH$_2$—CH$_2$—. R$_3$ and R$_4$ together with the nitrogen atom, may form a 5- or 6-member nitrogen-containing ring, more specifically, the 1-pyrrolidinyl or the 1-piperidinyl radical.

The compounds of generic Formula A, according to this embodiment of the invention, have the Formula III below:

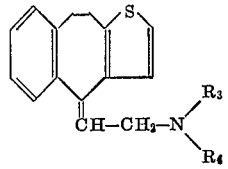
III

The phenyl group is not substituted in accordance with this embodiment of the invention.

In accordance with another embodiment of the invention, the group X is a nitrogen-containing substituent, wherein the nitrogen atom is separated from the ring carbon atom by three carbon atoms and the side chain substituent X may have the nitrogen atom as part of a ring which may be the pyrrolidine or the piperidine ring. More specifically, in accordance with this embodiment of the invention, the compounds of this invention have Formula IV below:

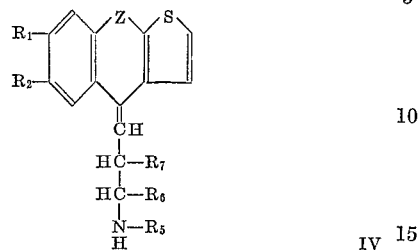

In accordance with this embodiment of the invention, $R_1$ and $R_2$ are both hydrogen, and Z is as defined above.

Several alternatives exist for Formula IV, as follows:

(i) $R_5$ and $R_6$ together form a trimethylene or tetramethylene group, and $R_7$ is hydrogen, or (ii) $R_5$ and $R_7$ together form a dimethylene or trimethylene group and $R_6$ is hydrogen, or (iii) $R_5$ is an alkyl group of between 1 and 4 carbon atoms, $R_6$ is hydrogen and $R_7$ is methyl.

Manifestly, in accordance with this embodiment of the invention, the nitrogen may be part of a heterocyclic ring, such as the 2- and the 3-piperidyl or the 2- and 3-pyrrolidinyl.

In the compounds of Formula B shown above, more specifically, Y is a nitrogen-containing substituent in which the nitrogen atom is separated from the ring carbon atom by three carbon atoms, which may or may not be substituted. The nitrogen atom may also be a part of a heterocyclic ring such as the 1-, 2-, and 3-pyrrolidinyl or the 1-, 2- and 3-piperidinyl, or the 1-(4-lower alkyl)-piperazinyl nucleus. More specifically, in accordance with this embodiment of the invention, compounds B, wherein $R_1$ and $R_2$ are both hydrogen, have Formula V:

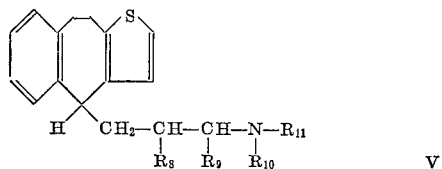

The pyrrolidine, piperidine or piperazine ring may be formed between $R_{10}$ and $R_{11}$ together with the nitrogen atom.

Several alternatives of compounds of Formula V exist as follows, according to (i), (ii), (iii), and (iiii) below:

In (i):
$R_8$ is hydrogen or methyl
$R_9$ is hydrogen
$R_{10}$ is a lower alkyl and
$R_{11}$ is hydrogen or lower alkyl.

In (ii):
$R_8$ is hydrogen or methyl
$R_9$ is hydrogen
$R_{10}$ and $R_{11}$ together with the nitrogen atom form a 1-pyrrolidinyl, 1-piperidinyl or a 1-(4-lower alkyl) piperazinyl.

In (iii):
$R_8$ and $R_{10}$ together form a dimethylene or trimethylene group, $R_9$ is hydrogen and $R_{11}$ is hydrogen or lower alkyl.

In (iiii):
$R_8$ is hydrogen
$R_9$ and $R_{10}$ form a trimethylene or tetramethylene group, and $R_{11}$ is hydrogen or lower alkyl.

The term "lower alkyl" as used above, indicates an alkyl group of from 1 to 4 carbon atoms.

Manifestly, according to the embodiment (iii) above, the compounds of the invention contain a 3-pyrrolidinyl or a 3-piperidinyl group. According to the embodiment (iiii) above, the compounds of the invention contain the 2-piperidinyl and the 2-pyrrolidinyl group.

The present invention also covers the acid addition salts of the compounds of general Formulas I, II, III, IV and V.

The compounds of the present invention are prepared from the ketone of Formula VI below, 9,10-dihydro-4H-benzo[4,5]cyclohepta[1,2-b]thiophen-4-one, in which $R_1$ and $R_2$ have the same meaning as above:

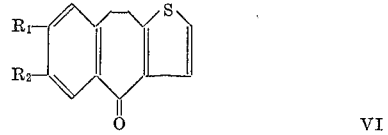

This substance may be prepared as follows: 2-thenyl-diethyl-phosphonate is condensed in a suitable anhydrous organic solvent and in the presence of an alkaline condensation agent with an o-phthalaldehydic acid, which may be substituted in the 4- or 5-position by a chlorine or bromine atom. The resulting 2-[2-(2-thienyl)-vinyl]-benzoic acid, or its chlorine or bromine derivative, is reduced to the corresponding 2-[2-(2-thienyl)-ethyl]-benzoic acid or its derivative and this is subjected to an intramolecular ring closure, whereby 9,10-dihydro-4H-benzo[4,5]cyclohepta[1,2-b]thiophen-4-one or a derivative substituted in the 6- or 7-position by a chlorine or bromine atom, is obtained. Sodium amalgam in aqueous alcohol may, for example, be used as the reducing agent and polyphosphoric acid as the condensation agent for the ring closure.

The compounds of Formula I above, are prepared as follows: The ketone of Formula VI above, is reacted with a 2-pyrrolidone of formula:

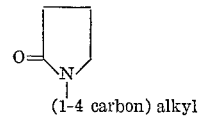

(1-4 carbon) alkyl in the presence of an alkali metal amide or an alkali metal amide or an alkali metal hydride. More specifically, the 2-pyrroidone is added to a suspension of an alkali metal amide, for instance, lithium, sodium or potassium amide in liquid ammonia, and a ketone of Formula VI above, dissolved in a suitable solvent, for instance, diethyl ether, is added. After stirring for from half to one hour at —35° C., ammonium chloride and a suitable organic solvent, e.g., diethyl ether, are added to the reaction mixture, the ammonia is allowed to evaporate and the reaction mixture is subsequently stirred with ice water and a solvent suitable for extraction, e.g., dichloromethane, diethyl ether or benzene. From the extract, the condensation product, which is a tertiary alcohol of Formula VII below, is obtained:

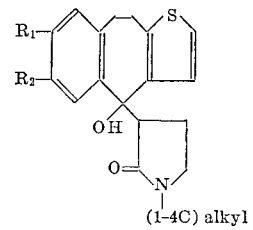

(1-4C) alkyl VII

The compound VII is then isolated and purified by conventional methods.

The reduction of the carbonyl compound VII is advantageously effected with lithium aluminium hydride or diborane in an inert organic solvent, e.g., tetrahydrofuran. The resulting complex is subsequently decomposed with saturated sodium sulphate solution, the inorganic compounds are filtered off and the reduction product of Formula VIII below is isolated from the filtrate.

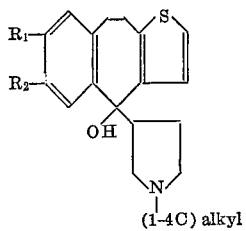

VIII

The compounds of Formulas VII and VIII, and the acid addition salts of compounds of Formula VIII are novel and also form part of the present invention. Compounds VIII may be purified by crystallization and, if required, converted into an acid addition salt.

The required compounds of Formula I may be obtained from the compounds of Formula VIII by the action of an agent for the splitting off of the elements of water, such as mineral acids, strong organic acids, acetic anhydride, thionyl chloride, acetyl chloride, zinc chloride and phosphorus oxychloride. The resulting compounds of Formula I are isolated from the reaction mixture and purified by crystallization and/or by conversion into an acid addition salt.

Examples of preferred acids for the addition salt formation are: hydrochloric, hydrobromic, phosphoric, sulphuric, methanesulphonic, acetic, malonic, fumaric, maleic, tartaric, hexahydrobenzoic and p-toluenesulphonic acid.

The compounds of Formula II above, are prepared either from the ketone of Formula VI or from 4H-benzo[4,5]cyclohepta[1,2-b]thiophen-4-one of Formula VIa below, which differs from Formula VI because of the presence of a double bond in the 9,10-position.

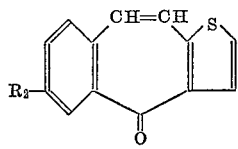

VIa

For the preparation of compounds of Formula VIa, the dehydrogenation in the 9,10-position, is advantageously effected as follows: The 9,10-dihydro-4H-benzo[4,5]cyclohepta[1,2-b]thiophen-4-one, or a derivative substituted in the 6-position by a chlorine or bromine atom, prepared as described above, is heated with N-bromosuccinimide in absolute carbon tetrachloride and in the presence of a catalytic amount of dibenzoyl peroxide, and the resulting reaction product is subsequently heated with a trialkyl amine.

Specifically, the preparation of compounds of Formula II is conducted as follows: a compound of Formula VI or VIa, depending on whether a product with —CH$_2$—CH$_2$— or —CH=CH— is desired, is reacted with a 3-dimethylaminopropyl-magnesium halide, in which halide signifies chlorine, bromine, or iodine, the reaction product is hydrolyzed and the resulting tertiary alcohol is subsequently treated with an agent for removing water, whereby a compound of Formula IX below, is obtained:

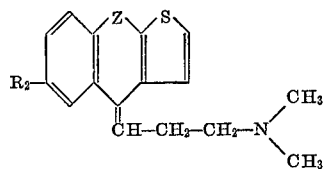

IX

The compounds of Formula IX are then reacted with a chloroformic acid ester of formula Cl—COOR$_{12}$ wherein R$_{12}$ is a lower alkyl of between 1 and 4 carbon atoms or an aralkyl radical of 7 to 10 carbon atoms. The product has Formula X below:

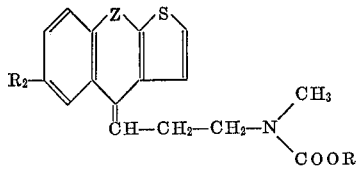

X

One advantageous method of producing the compounds of Formula X is as follows: a compound of Formula IX dissolved in an inert organic anhydrous solvent, preferably benzene, toluene, heptane, carbon tetrachloride or tetrahydrofuran, is added at room temperature to a solution of the chloroformic acid ester, e.g., chloroformic acid ethyl ester or chloroformic acid benzyl ester, dissolved in the same solvent. To complete the reaction, the mixture is further heated to the boiling point under reflux for 1 to 3 hours. The resulting compounds of Formula X are isolated and purified in known manner.

In order to produce compounds of Formula II, the radical COOR$_{12}$ in a compound of Formula X above, is hydrolytically replaced with a hydrogen atom. This may be effected, for example, by heating a compound of Formula X in an alkanol of from 1 to 6 carbon atoms inclusive, preferably n-butanol, with an alkali metal hydroxide, e.g., potassium hydroxide, for several hours. The splitting off of the COOR$_{12}$ radical may, however, also be effected in an acid medium, e.g., by heating with a strong inorganic acid. It is advantageous to work in an inert atmosphere, e.g., in an atmosphere of nitrogen, in order to obtain a better yield. The compounds of Formula II may be isolated from the reaction mixture in manner known per se and purified by crystallization or by conversion into a suitable salt.

The following are examples of acids which may be used for acid addition salt formation with the compounds of Formula II: hydrochloric, hydrobromic, phosphoric, sulphuric, acetic, malonic, fumaric, maleic, tartaric, malic, hexahydrobenzoic and p-toluenesulphonic acids.

The same ketone of Formula VI above, is used to prepare the compounds of Formula III above, by reaction with a compound of Formula XI:

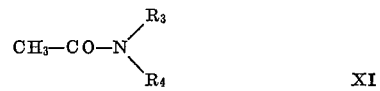

XI in which R$_3$ and R$_4$ have the same meaning as above, in the presence of an alkali metal amide or hydride. The nitrogen atom may form together with R$_3$ and R$_4$, the 1-pyrrolidinyl or the 1-piperidinyl ring.

The process of the invention may, for example, be effected as follows:

A compound XI, e.g., N,N-dimethylacetamide or N-acetyl pyrrolidine, is added to a suspension of an alkali metal amide, e.g., lithium amide, sodium amide, or potassium amide, in liquid ammonia and subsequently compound VI, dissolved in a suitable solvent, e.g., diethyl ether, is added thereto. After stirring at −35° C. for thirty to sixty minutes, ammonium chloride and a suitable organic solvent, e.g., diethyl ether, are added to the reaction mixture. The ammonia is subsequently evaporated and the reaction mixture stirred with ice water and with a solvent suitable for the extraction, e.g., dichloromethane, diethyl ether or benzene. The compounds of Formula XII below, are then isolated and purified in accordance with known methods:

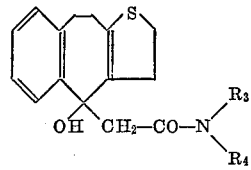

XII

The reduction of the carbonyl group in the amide moiety is preferably effected with lithium aluminum hydride or diborane in an inert organic solvent, e.g., tetrahydrofuran. Subsequently the reaction complex is decomposed by hydrolysis, preferably with a saturated sodium sulphate solution when lithium aluminum hydride is utilized for the reduction, or with a dilute acid solution, when the reduction is effected with diborane. The inorganic byproducts are filtered off and the compound of Formula XIII below

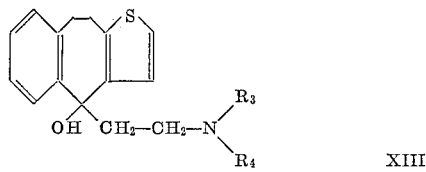

XIII is isolated from the filtrate in accordance with known methods. Purification may be conducted by means of crystallization and, if desired, through salt formation.

The compounds of Formula III may then be obtained from the compounds of Formula XIII by splitting off the elements of water with suitable agents, such as, mineral acids, strong organic acids, acetic anhydride, thionyl chloride or phosphorus oxychloride. The resulting compounds of Formula III are isolated from the reaction mixture, if desired, separated into their stereoisomeric forms and purified by crystallization and/or salt formation.

At room temperature the compounds of Formula III are solid, crystalline compounds which, with inorganic or organic acids, form salts which are stable and crystalline at room temperature. Preferred salts are the hydrochlorides, hydrobromides, phosphates, sulphates, malonates, fumarates, maleates, tartrates, hexahydrobenzoates and p-toluene sulphonates.

The compounds in accordance with Formula IV above are prepared from a compound of Formula XIV below:

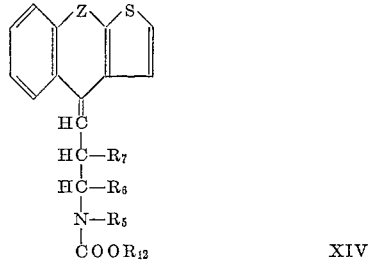

XIV in which $R_{12}$ is an alkyl between 1 and 4 carbon atoms or an aralkyl containing between 7 and 10 carbon atoms and Z, $R_5$, $R_6$ and $R_7$ are as defined above. Specifically, a compound of Formula XIV is subjected to hydrolysis to split off the alkoxy or aralkoxycarbonyl radical and if an acid addition salt is required, the resulting compound of Formula IV is reacted with an organic or inorganic acid.

Examples of acids for acid addition salt formation with compounds of Formula IV are: hydrochloric, hydrobromic, phosphoric, sulphuric, acetic, malonic, fumaric, maleic, tartaric, malic, hexahydrobenzoic, benzenesulphonic and p-toluene sulphonic acid.

The compounds of Formula XIV may be produced by reacting a compound of Formula XV

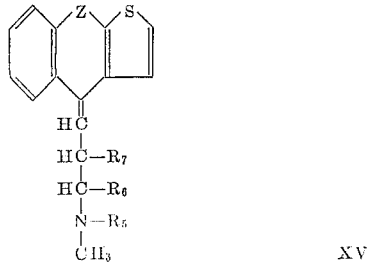

XV with a chloroformic acid ester of formula: $Cl-COOR_{12}$ in which Z, $R_5$, $R_6$, $R_7$ and $R_{12}$ have the same meaning as above, at a temperature between 15–30° C.

After the reaction has proceeded to approximately 80% completion, the mixture may be heated at reflux to speed up the final stage of reaction.

The compounds of Formula XIV and their acid addition salts are also new. Examples of suitable acids for addition salt formation with compounds of Formula XIV are the same as those indicated in connection with compounds of Formula IV.

One method of producing the compounds of Formula IV may be effected as follows: a compound of Formula XV dissolved in an inert organic anhydrous solvent, preferably benzene, toluene, carbon tetrachloride or tetrahydrofuran, is added at a temperature between 15–30° C., e.g., room temperature, to a solution of a chloroformic acid ester, e.g., chloroformic acid ethyl ester or chloroformic acid benzyl ester, in the same solvent. After the reaction has proceeded to approximately 80% completion, the reaction mixture may be heated to the boiling point under reflux for one to three hours. The reaction mixture may, however, also be left standing for several hours at room temperature. The resulting compound of Formula XIV is isolated and purified in manner known per se. The alkoxycarbonyl or aralkoxycarbonyl radical in said compound of Formula XIV is replaced hydrolytically by a hydrogen atom, for example, by heating the compound XIV in an alkanol of low molecular weight, preferably n-butanol, for several hours with an alkali, especially an alkali metal hydroxide, e.g., potassium hydroxide. The hydrolysis may also be effected in an acid medium, e.g., with aqueous 48% hydrogen bromide solution. The resulting compounds of Formula IV are isolated from the reaction mixture in manner known per se and purified, e.g., by crystallization or by conversion into a suitable salt.

The compounds of Formula V, excluding those wherein $R_{11}$ is hydrogen, may be prepared from a compound of Formula XVI below, by reduction with hydrogen iodide and red phosphorus:

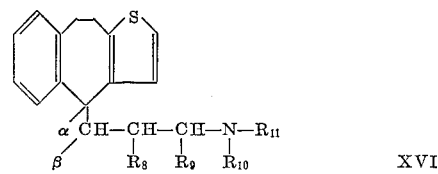

XVI in which $R_8$, $R_9$, $R_{10}$, $R_{11}$ have the same meaning as above, except that $R_{11}$ cannot be hydrogen, and alpha and beta together represent a second bond or alpha is hydroxyl and beta is hydrogen. If an acid addition salt is required, the product is then reacted with an organic or inorganic acid.

One advantageous method of producing compounds of Formula V in which $R_{11}$ is other than hydrogen, consists of reacting a compound of Formula XVI, preferably in solution, for instance, in glacial acetic acid, although a solvent is not essential, in the form of its hydrohalide, with red phosphorus and hydriodic acid. For instance, the hydrochloride of 4-hydroxy-4-(3-dimethylaminopropyl)- or of 4-hydroxy-4[3-(4-methyl-piperazinyl) - propyl]9,10-dihydro-4H-benzo - [4,5]cyclohepta-[1,2-b]thiophene, is heated to 80–130° C. for 5 minutes to 2 hours with red phosphorus and hydriodic acid. After filtration of the reaction mixture and evaporation, the residue is shaken in the presence of an alkali, for instance, 20% sodium hydroxide solution, with an organic solvent, preferably methylene chloride. The iodine is removed from the organic phase with an aqueous solution of sodium thiosulphate and the desired compound of Formula V is isolated in manner known per se and is purified, preferably by conversion into an acid addition salt.

Compounds of Formula V, in which $R_{11}$ is hydrogen, may be advantageously obtained from the compounds obtained above in which $R_8$ and $R_{10}$ are defined above and $R_{11}$ is methyl, by reaction with a chloroformic ester of formula Cl—$COOR_{12}$ in which $R_{12}$ has the same meaning as above, followed by replacement of the ester group with hydrogen. For instance, 4-(3-dimethylaminopropyl)-9,10-dihydro-4H-benzo[4,5]cyclohepta[1,2 - b]thiophene, dissolved in an inert organic solvent, preferably benzene, toluene carbon tetrachloride or tetrahydrofuran, is added at a temperature of 15–30° C., to a solution of chloroformic acid ester, such as the ethyl ester or the benzyl ester, in the same solvent. In order to complete the reaction, the mixture may be heated to boiling under reflux for one to three hours after the reaction has gone about 80% to completion, or the reaction mixture may be allowed to stand for several hours at room temperature. The resulting compounds of Formula XVII below may be isolated and purified by conventional methods:

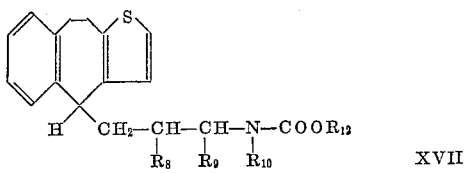

XVII

The alkoxycarbonyl or aralkoxycarbonyl radical is then replaced by a hydrogen atom by hydrolysis, for example in an alkaline medium, by heating for several hours in an alkanol with from 1 to 6 carbon atoms, preferably n-butanol, and an alkali metal hydroxide, e.g., potassium hydroxide, or by acid hydrolysis, for instance, by heating with a concentrated inorganic acid, such as 48% aqueous hydrobromic acid.

The invention further provides for production of compounds of Formula XVIIb:

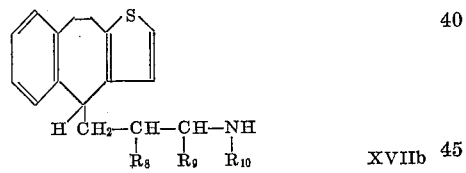

XVIIb wherein $R_8$, $R_9$ and $R_{10}$ have the meanings defined above, by reacting a compound XVIIa:

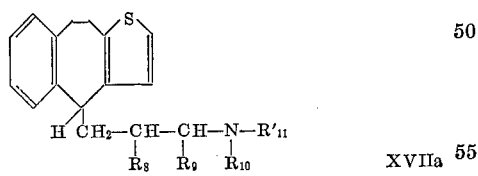

XVIIa wherein $R_8$, $R_9$ and $R_{10}$ have the meanings defined above, $R_9$ is hydrogen and $R_{10}$ is alkyl of 1 to 4 carbon atoms; $R'_{11}$ is methyl when $R_8$ and $R_{10}$ together are dimethylene or trimethylene and $R_9$ is hydrogen; or $R'_{11}$ is alkyl of 1 to 4 carbon atoms when $R_8$ is hydrogen and $R_9$ and $R_{10}$ together are trimethylene or tetramethylene, wherein $R'_{11}$ is methyl, with a chloroformic acid ester Cl—COO-alkyl of 1 to 4 carbon atoms or Cl—COO-aralkyl of 7 to 10 carbon atoms, at a temperature of 15–30° C. and hydrolyzing the resulting compound(s) XVII so as to split off its alkoxycarbonyl or aralkoxycarbonyl radical to produce the required compound(s) and, when an acid addition salt is required, reacting with an organic or inorganic acid.

The compounds of Formula XVI, excluding those in which $R_{11}$ is hydrogen, may be produced by reacting 9,10-dihydro-4H-benzo[4,5]cyclohepta[1,2 - b]thiopen-4-one with a Grignard compound of Formula XVIII:

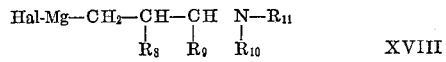

XVIII in which $R_8$, $R_9$, $R_{10}$ are as defined above, and $R_{11}$ is other than hydrogen, and Hal signifies chlorine, bromine or iodine. By subsequent hydrolysis of the resulting product, compounds of Formula XVI, in which alpha is hydroxyl and beta is hydrogen, are obtained. Compounds of Formula XVI in which alpha and beta together represent a second bond, may be obtained from the product above by splitting off water, e.g., with hydrogen chloride and glacial acetic acid.

Compounds of formula V in which $R_{11}$ is hydrogen, may also be prepared from compounds of Formula XIX:

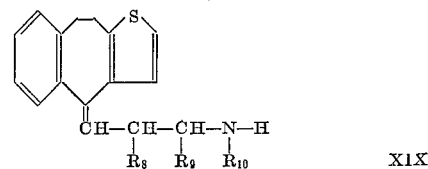

XIX by reduction with red phosphorus and hydrogen iodide. If an acid addition salt is required, the product may then be reacted with an organic or inorganic acid, such as hydrochloric, hydrobromic, phosphoric, sulphuric, acetic, malonic, fumaric, maleic, tartaric, malic, hexahydrobenzoic, benzenesulphonic and p-toluenesulphonic acid.

Compounds of Formula XIX may be produced by reacting compounds of Formula XVI, in which alpha and beta together represent a second bond, and $R_{11}$ is methyl, with a chloroformic acid ester as above in which $R_{12}$ is lower alkyl or aralkyl and subjecting the resulting compound of Formula XX below:

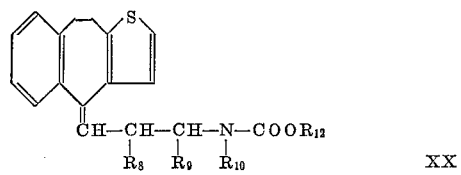

XX in which $R_8$, $R_9$, $R_{10}$, and $R_{12}$ are as defined above, to an alkaline or acid hydrolysis.

The compounds of Formula XVI and Formula XVII and their addition salts with acids, for instance, the acids cited above, are also novel.

The compounds within the scope of this invention are distinguished by strong effects which are characteristic for antidepressives; in tests on animals they produce inter alia, an inhibition of the vegetative and motor symptoms caused by reserpine and tetrabenazine, a potentiation of the effect of noradrenalin and certain sedative and anticholinergic effects. Although they have some neuroleptic properties, these are not very pronounced and they therefore show a specific antidepressive effect. The toxicity of the compounds of this invention is relatively low, they are therefore suitable for use in the treatment of neurotic and psychotic disorders, especially depression conditions, and also in the therapeutic treatment of psychosomatic disorders. The compounds within the scope of this invention are especially suitable for administration in the form of their physiologically acceptable, water-soluble salts. They are suitable for use as pharmaceuticals on their own or in the form of appropriate medicinal preparations for oral, enteral or parenteral administration. In order to produce appropriate medicinal preparations the compounds are worked up with inorganic or organic adjuvants which are inert and physiologically acceptable. Examples of such adjuvants are:

tablets and dragees: lactose, starch, talc and stearic acid;
injectable solutions: water, alcohols, glycerin and vegetable oils;
suppositories: natural or hardened oils and waxes.

The preparations may furthermore contain suitable preserving agents, stabilizing and wetting agents, solubilizers, sweetening and coloring substances and flavorings.

The present invention therefore further provides pharmaceutical preparations containing, in addition to a physiologically acceptable carrier, a compound of the invention and/or an acid addition salt thereof. For instance, a suitable dosage of the compounds of general Formula IV has been found to be between 50 and 400 mg. administered orally. A suitable dosage of compounds of general Formula V is between 15 and 300 mg. per day.

The anti-depressant properties of the compounds of this invention are particularly pronounced in the case of 4 - [1 - methyl - pyrrolidinylidene - (3)] - 9,10 - dihydro-4H-benzo[4,5]cyclohepta[1,2-b]thiophene.

Also very suitable is the compound 4-(2-dimethyl-aminoethylidene) - 9,10 - dihydro - 4H - benzo[4,5] - cyclohepta[1,2-b]thiophene. A suitable daily dosage of this compound is between 5 and 15 mg.

The following examples are described in detail below, for the purpose of better illustration of the invention.

EXPERIMENTAL

Example 1.—Preparation of 9,10-dihydro-4H-benzo[4,5] cyclohepta[1,2-b]thiophen-4-one (Compound VI)

2-[2-(2-thienyl)-vinyl]-benzoic acid: 30 g. of powdered, well dried sodium methylate are added to a solution of 117 g. of thienyl-diethyl-phosphonate (boiling point 120–124°/0.06 mm. Hg) in 200 cc. of freshly distilled dimethyl formamide, whereby the temperature of the solution rises to 45–50°. The flask is then placed in an ice bath and a solution of 80 g. of o-phthalaldehydic acid in 200 cc. of dimethyl formamide is added dropwise at such a rate that the temperature remains between 35 and 40° and stirring is then effected for 30 to 60 minutes at room temperature. 1600 cc. of water (temperature 10–15°) are then added to the reaction solution while cooling well, whereby a red oil separates. The solution is then made alkaline with potassium carbonate, whereby the oil redissolves, the reddish brown solution is shaken three times with benzene and hydrochloric acid is carefully added at 10–15° to adjust the pH value of the aqueous solution to 4. After several hours in a refrigerator the precipitated acid is filtered off, dried and recrystallized from benzene. 2-[2-(2-thienyl)-vinyl]-benzoic acid has a melting point of 133–135°. The mother liquid is shaken three times with methylene chloride, the organic phase is dried over sodium sulphate and evaporated at 15 mm. Hg. The residue is crystallized from benzene, whereby a further portion of acid, having a melting point of 133–135°, is obtained.

2-[2-(2-thinyl)-ethyl]benzoic acid: 7.5 g. of sodium are melted under anhydrous toluene, whereupon 375 g. of pure mercury are added while shaking frequenly at such a rate that the toluene boils. The mixture is then heated to 120–140° while stirring and as soon as all the toluene is distilled off, cooling is effected to 50°. A solution of 20 g. of 2-[2-(2-thionyl)vinyl)-benzoic acid in 150 cc. of 95% ethanol is then poured onto the homogeneous amalgam and the mixture is shaken for half an hour. The mercury is then separated, washed twice with ethanol and the combined ethanolic solutions are diluted with 1200 cc. of water. The solution is filtered through highly purified diatomaceous earth, acidified with hydrochloric acid and cooled to 5°. After several hours the precipitated acid is filtered off and crystallized from chloroform/hexane. Melting point 110–111°.

9,10 - dihydro - 4H - benzo[4,5]cyclohepta[1,2-b]thiophen-4-one: 59 cc. of an 84% phosphoric acid and 86 g. of phosphorous pentoxide are first stirred at 125–130° for half an hour. 20 g. of powdered 2-[2-(2-thienyl)-ethyl]-benzoic acid are then added at the same temperature during the course of half an hour. The reaction mixture is stirred for a further 2 hours at 125–130°, poured into 1000 cc. of water, the solution is filtered through highly purified diatomaceous earth and extracted three times with methylene chloride. The organic phase is washed with a 2 N sodium carbonate solution, dried over magnesium sulphate, the solvent is evaporated and the residue distilled in a high vacuum, whereby 9,10-dihydro - 4H - benzo[4,5]cyclohepta[1,2-b] thiophen - 4-one distills over at 125–140°/0.05 mm. Hg in the form of a green oil.

Example 2.—Preparation of 7-chloro-9,10-dihydro-4H-benzo[4,5]cyclohepta[1,2-b]thiophen-4-one 3-bromo-5-chloro-phthalide: A mixture of 72.5 g. of 5-chloro-phthalide, 76.6 g. of N-bromo-succinimide and 0.25 g. of dibenzoyl peroxide is heated to the boil, while stirring for 22 hours, in 4300 cc. of absolute carbon tetrachloride. After cooling the reaction mixture filtration is effected and the filtrate is evaporated to dryness at reduced pressure and at 50°. After recrystallization from acetone the pure 3-bromo-5-chloro-phthalide, having a melting point of 108–110°, is obtained from the crystalline residue.

4-chloro-phthalaldehydic acid: 59.1 g. of 3-bromo-5-chloro-phthalide are suspended in 600 cc. of water and the suspension is heated to 100° for 8 hours while stirring well. Cooling is then effected to 0°, the 4-chlorophthaldehyde acid is filtered off and washed with ice cold water until neutral. Pure 4-chloro-phthalaldehydic acid, having a melting point of 184–186°, is obtained without further purification.

4-chloro-2-[2-(2-thienyl)-vinyl]-benzoic acid: A solution of a mixture of 36.9 g. of 4-chloro-phthalaldehydic acid and 47.0 g. of 2-thinyl-diethyl-phosphonate in 130 cc. of dimethyl formamide is added dropwise while stirring to a suspension of dry sodium methylate, produced from 10.4 g. of sodium in 110 cc. of dimethyl formamide. The dropwise addition is effected at such a rate that the internal temperature always remains at 35–45°. Stirring is subsequently effected for a further 15 minutes at room temperature and the mixture is then poured into 6000 cc. of water. Dilute hydrochloric acid is carefully added to acidify the alkaline aqueous solution to a pH value of 3. The precipitated material is filtered off and after recrystallization of the crude product from ethanal, pure 4-chloro-2-[2-(2-thionyl)vinyl]-benzoic acid, having a melting point of 198–200°, is obtained.

4-chloro-2-[2-(2-thienyl)-ethyl]-benzoic acid: A suspension of 18.5 g. of 4-chloro-2-[2-(2-thienyl)-vinyl]-benzoic acid in 350 cc. of 94% ethanol is added at once at 50° to sodium amalgam, produced from 7.0 g. of sodium and 520 g. of mercury. Stirring is subsequently effected for 3 hours at room temperature and the ethanolic solution of the reaction product is then separated from the mercury. Evaporation to dryness is effected at 60° and reduced pressure and the residue is then dissolved in 1000 cc. of water. The solution is filtered and the filtrate is acidified with concentrated hydrochloric acid. The reaction product is extracted with ether, the extracts are dried over sodium sulphate and the solvent is evaporated at reduced pressure and 30°. The crystalline residue is recrystallized from ethanol and yields pure 4-chloro-2-[2-(2-thienyl)-ethyl]-benzoic acid, having a melting point of 127–128°.

7 - chloro - 9,10 - dihydro - 4H - benzo[4,5]cyclohepta [1,2-b]thiophen-4-one: 104 g. of phosphorus pentoxide and 74 cc. of an 80% phosphoric acid are mixed and the mixture is heated to 140° while stirring for half an hour. Subsequently 25.7 g. of 4-chloro-2-[2-(2-thienyl)- ethyl]-benzoic acid are added at the same temperature and stirring is effected for a further 3 hours at 140°. The hot reaction mixture is then poured into 1400 cc. of water. Extraction is effected several times with ether, the combined extracts are dried over sodium sulphate and the solvent is evaporated at 30° and reduced pressure. The viscous residue is distilled in a hot air bath at a strongly reduced pressure. Boiling point 170–180°/0.1 mm. Hg. The distillate is made to crystallize from a mixture of ether and petroleum ether. Pure 7-chloro-9,10-dihydro-4H-benzo[4,5]cyclohepta[1,2-b] thiophen - 4 - one melts at 63–64°.

Example 3.—Preparation of 6-chloro-9,10-dihydro-4H-benzo[4,5]cyclohepta[1,2-b]thiophen-4-one The substance is prepared as follows:

5-chloro-phthalaldehydic acid: A mixture of 60 g. of 5-chloro-phthalaldehydic acid, 61.5 g. of N-bromo-succinimide and 0.15 g. of benzoyl peroxide in 4000 cc. of anhydrous carbon tetrachloride is heated to boiling under stirring for 22 hours. The hot solution is filtered and the filtrate is evaporated at 15 mm. Hg. The crude 3-bromo-6-chloro-phthalide is subsequently heated to 100° with 400 cc. of water for 8 hours and the solution is filtered through highly purified diatomaceous earth. After cooling the precipitated acid is filtered off, the diatomaceous earth is heated to boiling for several hours together with the mother liquor, the hot solution is filtered and evaporated to a small extent at reduced pressure, whereby a further portion of acid is obtained. After drying in a vacuum at 90° the acid melts at 136–138°.

5-chloro-2-[2-thienyl-(2)-vinyl-benzoic acid: 1 to 2 cc. of a solution of 70 g. of 5-chloro-phthalaldehydic acid and 89 g. of 2-thienyl-diethyl-phosphonate in 135 cc. of dimethyl formamide, are added dropwise to a suspension of 45.6 g. of sodium methylate in 135 cc. of dimethyl formamide, whereby the temperature of the mixture rises to 35–40°. The flask is then placed in an ice bath and the remainder of the soltuion of 5-chloro-phthalaldehydic acid and 2-thienyl-diethyl-phosphonate is added dropwise, as rapidly as possible and at such a rate that the internal temperature remains at 35–40°. The reaction mixture is then stirred for an additional 30 minutes at room temperature. 4300 cc. of water are slowly added to the reaction solution at 10–15° under good cooling and the aqueous solution is extracted with 300 cc. of benzene. 2 N hydrochloric acid solution is then carefully added to adjust the pH value of the aqueous solution to 3 to 4. After several hours the precipitated acid is filtered off and dried. Melting point 152–153° from benzene.

5-chloro-2-[2-thienyl-(2)-ethyl]-benzoic acid: 18.8 g. of sodium are melted under anhydrous toluene, whereupon 1250 g. of pure mercury are added dropwise while shaking frequently, at such a rate that the toluene boils. The mixture is then heated to 120–140° under stirring and as soon as all the toluene is distilled off, cooling is effected to 60°. The homogeneous amalgam is covered with a solution of 50 g. of 5-chloro-2-[2-thienyl-(2)-vinyl]-benzoic acid in 350 cc. of 95% ethanol and the mixture is vigorously shaken for 1½ to 2 hours. The mercury is then separated, washing is effected three times with ethanol and the combined ethanolic solutions are diluted with 5000 cc. of water. The solution is filtered through highly purified diatomaceous earth and a 2 N hydrochloric acid solution is slowly added under stirring and cooling, to adjust the pH value to 1. After several hours the precipitated acid is filtered off and recrystallized from ethanol. Melting point 134–135°.

6 - chloro - 9,10 - dihydro - 4H - benzo[4,5]cyclohepta[1,2-b]thiophen-4-one: 90 cc. of an 84% phosphoric acid and 126 g. of phosphorus pentoxide are stirred at 125–130° for half an hour. Then 30 g. of finely powdered 5-chloro-2-[2-thienyl-(2)-ethyl]-benzoic acid are added at the same temperature during the course of half an hour. The reaction mixture is stirred for one additional hour at 125–130°, poured into 1500 cc. of ice water, the solution is filtered through highly purified diatomaceous earth and extracted three times with methylene chloride. The organic phase is first washed with a 2 N sodium carbonate solution, then with water, dried over magnesium sulphate, the solvent is evaporated and the residue is distilled in a high vacuum, whereby 6-chloro-9,10-dihydro-4H-benzo[4,5]cyclohepta[1,2-b]thiophen-4-one distills over at 185–195°/0.1 mm. Hg in the form of an oil which crystallizes. Melting point 107–108° from ether.

Example 4.—Preparation of 4-[1 - methyl - pyrrolidinylidene - (3)] - 9,10 - dihydro - 4H-benzo[4,5]cyclohepta[1,2-b]thiophene The substance is prepared as follows:

(a) 4 - hydroxy - 4 - [1 - methyl - 2 - oxopyrrolidinyl-(3)]-9,10 - dihydro - 4H - benzo[4,5]cyclohepta[1,2-b]-thiophene.—Approximately 0.03 g. of ferric nitrate are added to 100 cc. of liquid ammonia, subsequently 0.49 g. of lithium are added portionwise and the resulting dark blue mixture is stirred at −35° for half an hour. 4.56 g. of 1-methyl-(2)-pyrrolidone are then added to the resulting gray lithium amide suspension. After stirring the mixture at −35° for half an hour, a solution of 5.0 g. of 9,10-dihydro-4H-benzo[4,5]cyclohepta[1,2 - b]thiophen - 4-one in 15 cc. of absolute ether is added dropwise and stirring is effected for two more hours. 4.2 g. of ammonium chloride and 50 cc. of ether are then added portionwise to the reaction mixture. After evaporating the ammonia, whereby the temperature rises to +10°, the reaction mixture is stirred with 300 cc. of ice water and 100 cc. of dichloromethane. The organic layer is separated, dried over sodium sulphate and evaporated. The residue is recrystallized from isopropanol. Melting point 73–86°. (Mixture of diastereoisomers.)

(b) 4 - hydroxy - 4 - [1 - methyl - pyrrolidinyl - (3)]-9,10 - dihydro - 4H - benzo[4,5]cyclohepta[1,2 - b]-thiophene.—A solution of 5.2 g. of 4-hydroxy-4-[1-methyl - 2 - oxopyrrolidinyl - (3)] - 9,10 - dihydro - 4H-benzo[4,5]cyclohepta[1,2-b]thiophene in 15 cc. of absolute tetrahydrofuran is added dropwise under stirring at 5–10° to a suspension of 0.95 g. of lithium aluminium hydride in 15 cc. of absolute tetrahydrofuran. The mixture is subsequently heated to boiling at reflux for one hour longer, cooling is effected and 5 cc. of saturated sodium sulphate solution are added dropwise under cooling. The resulting precipitate is filtered and extracted by boiling several times with tetrahydrofuran. The combined tetrahydrofuran filtrates are evaporated, the residue is taken up in 40 cc. of ether and the solution is extracted with a 2 N tartaric acid solution. The tartaric acid extract is then made alkaline with a 30% sodium hydroxide solution, the precipitated base is taken up in ether, the ethereal solution is dried over potassium carbonate and the solvent is evaporated. The residue is recrystallized several times from benzene. 4-hydroxy-4-[1-methyl-pyrrolidinyl - (3)] - 9,10 - dihydro - 4H - benzo[4,5]cyclohepta[1,2-b]thiophene melts at 155–159°.

(c) 17 cc. of concentrated hydrochloric acid are added to a solution of 3.8 g. of the substance prepared above in 50 cc. of glacial acetic acid, boiling is effected for one minute and evaporation to dryness is effected at 12 mm. Hg. The residue is then taken up in 20 cc. of ethanol, the solvent is evaporated and the residue is dissolved in acetone. After the addition of 1–2 cc. of ether the hydrochloride crystallizes from the acetone solution in the form of a mixture of cis- and trans-isomers; this mixture is recrystallized several times from ethanol. Melting point 258–260° (decomposition).

Example 5.—Preparation of 7-chloro-4-[1-methyl-pyrrolidinylidene - (3)] - 9,10 - dihydro - 4H - benzo[4,5]cyclohepta[1,2-b]thiophene (a) 7-chloro - 4 - hydroxy - 4 - [1-methyl-2-oxopyrrolidinyl - (3)] - 9,10-dihydro-4H-benzo[4,5]cyclohepta

[1,2-b]thiophene.—Approximately 0.03 g. of ferric nitrate are added to 100 cc. of liquid ammonia, then 0.49 g. of lithium are added portionwise and the resulting dark blue mixture is stirred at —35° for one half hour. 4.56 g. of 1-methyl-2-pyrrolidone are then added to the resulting gray lithium amide suspension. After stirring the mixture at —35° for one half hour, a solution of 5.8 g. of 7-chloro - 9,10 - dihydro-4H-benzo[4,5]cyclohepta [1,2-b]thiophen-4-one in 60 cc. of absolute ether is added dropwise and stirring is carried out for two more hours, and then 4.2 g. of ammonium chloride and 50 cc. of ether are added portionwise. After evaporating the ammonia, whereby the temperature rises to +10°, the reaction mixture is stirred with 30 cc. of ice water and 100 cc. of dichloromethane. The organic layer is separated, dried over sodium sulphate and evaporated. The residue is recrystallized from isopropanol and methanol. Melting point 165–167°.

(b) 7-chloro - 4 - hydroxy - 4 - [1-methyl-pyrrolidinyl-(3)] - 9,10 - dihydro-4H-benzo[4,5]cyclohepta[1,2-b] thiophene.—80 cc. of a 0.661 molar ethereal lithium aluminium hydride solution are added dropwise to a solution of 11.5 g. of the compound obtained in (a) above in 60 cc. of absolute tetrahydrofuran at 5°. The reaction mixture is stirred for one half hour at room temperature, cooled to 5° and 10 cc. of saturated sodium sulphate are added dropwise under cooling. The resulting precipitate is filtered and washed several times with tetrahydrofuran. The combined tetrahydrofuran filtrates are evaporated, the residue is taken up in 120 cc. of ether and the solution is extracted with 2 N sulphuric acid. The sulphuric acid extract is then adjusted to a pH value of 11 with 30% sodium hydroxide solution and the precipitated base is taken up in methylene chloride. After drying the methylene chloride solution over sodium sulphate and evaporating the solvent, the base is recrystallized from benzene. Melting point 90–94°.

(c) 16 cc. of concentrated hydrochloric acid are added to a solution of 4.0 g. of the compound obtained in (b) above in 50 cc. of glacial acetic acid, heating is effected to 100° for 5 minutes and evaporation to dryness is effected at 12 mm. Hg. The residue is then taken up in 20 cc. of ethanol, the solvent is evaporated and the residue is triturated with 10 cc. of acetone. The resulting crystalline hydrochloride is recrystallized from ethanol. Melting point 235–237° (decomposition) (mixture of cis- and trans-isomers).

Example 6.—Preparation of 6-chloro-4-[1-methyl-pyrrolidinylidene - (3)] - 9,10-dihydro - 4H - benzo[4,5] cyclohepta[1,2-b]thiophene (a) 6-chloro - 4 - hydroxy - 4 - [1-methyl-2-oxopyrrolidinyl - (3)] - 9,10 - dihydro-4H-benzo[4,5]cyclohepta [1,2-b]thiophene.—This compound is obtained from 5.8 g. of 6-chloro - 9,10 - dihydro - 4H - benzo[4,5]cyclohepta[1,2-b]thiophen-4-one in 35 cc. of absolute tetrahydrofuran in a manner analogous to that described in Example 5a. Melting point 114–115° from carbon tetrachloride.

(b) 6-chloro - 4 - hydroxy - 4 - [1-methyl-pyrrolidinyl-(3)] - 9,10 - dihydro - 4H - benzo[4,5]cyclohepta[1,2-b]thiophene.—This compound is obtained in a manner analogous to that described in Example 5b. Melting point 169–171° from acetone (mixture of diastereoisomers).

(c) 6-chloro - 4 - [1-methyl-pyrrolidinylidene - (3)]-9,10 - dihydro - 4H - benzo[4,5]cyclohepta[1,2 - b]thiophene.—1 mol of water is split off from the compound obtained in (b) above in a manner analogous to that described in Example 5c. The resulting residue is then dissolved in ethanol, the solvent is evaporated and the residue is recrystallized first from isopropanol and then from ethanol. Melting point of the hydrochloride: 300–305° (decomposition, mixture of cis- and trans-isomers).

Example 7.—Preparation of 4-(3-methylamino-propylidene) - 9,10 - dihydro - 4H - benzo[4,5]cyclohepta [1,2-b]thiophene (a) 4-(3-dimethylaminopropyl) - 9,10 - dihydro-4H-benzo[4,5]cyclohepta[1,2 - b]thiophen-4-ol.— 2.2 g. of magnesium which have been activated with iodine are covered with a small amount of tetrahydrofuran and a few drops of ethylene bromide are added. After the reaction has commenced, a solution of 10.8 g. of 3-dimethylaminopropyl chloride in 20 cc. of tetrahydrofuran is added dropwise at such a rate that the solvent boils and subsequently heating to boiling is effected for two more hours. A solution of 8.2 g. of 9,10-dihydro-4H-benzo[4,5]cyclohepta[1,2-b]thiophen-4-one in 30 cc. of tetrahydrofuran is added dropwise during the course of 10 minutes and heating to boiling is effected for an additional 10 minutes under stirring. After cooling the reaction mixture is poured into a solution of 30 g. of ammonium chloride in 200 cc. of water, 200 cc. of methylene chloride are added and the mixture is filtered through highly purified diatomaceous earth. After separating the organic phase the aqueous portion is shaken out twice more with methylene chloride, the combined methylene chloride solutions are washed with water, dried over magnesium sulphate and evaporated at 15 mm. Hg. The oily residue is crystallized from ether/petroleum ether. The resulting 4-(3-dimethylaminopropyl)-9,10 - dihydro - 4H - benzo[4,5]cyclohepta[1,2-b]thiophen-4-ol melts at 101°.

(b) 4-(3 - dimethylamino-propylidene) - 9,10 - dihydro - 4H - benzo[4,5]cyclohepta[1,2-b]thiophene.—8 g. of 4-(3 - dimethylaminopropyl) - 9,10 - dihydro-4H-benzo[4,5]cyclohepta[1,2 - b]thiophen-4-ol, 80 cc. of glacial acetic acid and 32 cc. of concentrated hydrochloric acid are heated at reflux for 30 minutes, the reaction mixture is evaporated at 15 mm. Hg and the residue triturated with ethanol/ether (1:1). The precipitated hydrochloride is filtered off and recrystallized from ethanol/ether. The resulting 4-(3-dimethylamino-propylidene)-9,10 - dihydro - 4H - benzo[4,5]cyclohepta[1,2-b]thiophene hydrochloride melts at 222–224° (decomposition).

(c) A solution of 5.7 g. of 4-(3-dimethylamino-propylidene) - 9,10 - dihydro - 4H - benzo[4,5]cyclohepta[1,2-b]thiophene in 25 cc. of absolute benzene is added dropwise to a solution of 6.5 g. of chloroformic acid ethyl ester in 25 cc. of absolute benzene at room temperature during the course of half an hour. The mixture is subsequently heated to the boiling point under stirring for two more hours and after cooling, washing is effected thrice with 2 N hydrochloric acid and twice more with water. The benzene solution is dried over magnesium sulphate, and after evaporating the solvent, pure 4-(3-methyl - 3 - ethoxycarbonylaminopropylidene) - 9,10 - dihydro - 4H - benzo[4,5]cyclohepta[1,2-b]thiophene is obtained. $n_D^{25}=1.5857$.

(d) A solution of 6.2 g. of 4-(3 - methyl - 3 - ethoxycarbonylaminopropylidene) - 9,10 - dihydro - 4H - benzo [4,5]cyclohepta[1,2-b]thiophene and 5 g. of potassium hydroxide in 55 cc. of n-butanol is heated to the boiling point under stirring, for 6 hours in an atmosphere of nitrogen. The solvent is then evaporated, the residue is dissolved at 60° in a mixture of 65 cc. of 2 N sulphuric acid and 55 cc. of water and the solution is cooled. The acid solution is extracted with 55 cc. of hexane, whereby three layers are obtained. The two lower layers are separated and the upper hexane layer is washed once more with 20 cc. of 1 N sulphuric acid. The combined aqueous extract is made strongly alkaline with sodium hydroxide solution and extracted thrice with ether. The combined ethereal extracts are washed with water, dried over magnesium sulphate and then evaporated. The resulting residue is then dissolved in isopropanol and an isopropanolic hydrogen chloride solution is added to the resulting solution. After several hours, the 4-(3-methylamino-propylidene) - 9,10 - dihydro - 4H - benzo[4,5]cyclohepta[1,2-b]thiophene hydrochloride is filtered off and recrystallized from ethanol/isopropanol. Melting point 236.5–238.5° (decomposition).

Example 8.—Preparation of 6-chloro-4-(3-methylaminopropylidene) - 9,10 - dihydro - 4H - benzo[4,5]cyclohepta[1,2-b]thiophene (a) 6-chloro - 4 - (3-dimethylaminopropyl) - 9,10 - dihydro - 4H - benzo[4,5]cyclohepta[1,2 - b]thiophen-4-ol.—Melting point 140.5–141.5° from ethanol. The compound is produced in a manner analogous to that of 4-(3 - dimethylaminopropyl) - 9,10 - dihydro - 4H - benzo[4,5]cyclohepta[1,2 - b]thiophen - 4 - ol, (Example 7a above).

(b) 6-chloro - 4 - (3 - dimethylamino-propylidene)-9,10 - dihydro - 4H - benzo[4,5]cyclohepta[1,2-b]thiophene.—5 g. of the chloro compound from the above step are heated at reflux for one hour in a mixture of 75 cc. of glacial acetic acid and 30 cc. of concentrated hydrochloric acid, the reaction mixture is then evaporated at 15 mm. Hg to half its volume, diluted with 600 cc. of water and made strongly alkaline with sodium hydroxide solution. The aqueous alkaline solution is then extracted thrice with methylene chloride, the combined methylene chloride extracts are washed with water and dried over magnesium sulphate. After evaporating the solvent the oily residue is crystallized from ligroin (boiling point 70–80°). 6-chloro - 4 - (3 - dimethylamino-propylidene)-9,10 - dihydro - 4H - benzo[4,5]cyclohepta[1,2-b]thiophene melts at 106–107°.

(c) 6-chloro - 4 - (3 - methyl-3-ethoxycarbonylaminopropylidene) - 9,10 - dihydro - 4H - benzo[4,5]cyclohepta[1,2-b]thiophene and 2.1 g. of chloroformic acid ethyl ester in 25 cc. of absolute benzene in a manner analogous to that described in Example 7c.

(d) A solution of 2 g. of 6-chloro-4-(3-methyl-3-ethoxycarbonylamino-propylidene) - 9,10 - dihydro - 4H-benzo[4,5]cyclohepta[1,2-b]thiophene and 1.45 g. of potassium hydroxide in 16 cc. of n-butanol are reacted in a manner analogous to that described in Example 7d above.

The hydrochloride is produced by adding a saturated ethereal hydrogen chloride solution to the ethereal solution of the base. The precipitated 6-chloro-4-(3-methylamino-propylidene) - 9,10 - dihydro - 4H - benzo[4,5]cyclohepta[1,2-b]thiophene hydrochloride melts at 215–217° (decomposition) after recrystallization from isopropanol.

Example 9.—Preparation of 4-(3-methylamino-propylidene)-4H-benzo[4,5]cyclohepta[1,2-b]thiophene (a) 4 - H - benzo[4,5]cyclohepta[1,2-b]thiophen-4-one.—A mixture of 32.1 g. of the dihydro compound, prepared in Example 1 above, 26.7 g. of N-bromosuccinimide and 0.3 g. of benzoyl peroxide in 250 cc. of absolute carbon tetrachloride is heated to boiling for 4 hours. After cooling to 50°, the reaction mixture is filtered through highly purified diatomaceous earth and the solvent is evaporated at 15 mm. Hg. The resulting oily residue is then heated for 2 hours together with 200 cc. of triethylamine under stirring. After evaporating unconverted triethylamine, 250 cc. of methylene chloride are added to the residue and the resulting solution is washed thrice with 2 N hydrochloric acid and twice with water. After drying the solution over magnesium sulphate, the solvent is removed at reduced pressure. The residue is distilled in a high vacuum, whereby 4H-benzo[4,5]cyclohepta[1,2-b]thiophen - 4 - one distils over at 173–180°/0.1 mm. Hg in the form of an oil and crystallizes upon cooling. Melting point 109–110° after recrystallization from ethanol.

(b) 4-(3 - dimethylamino - propyl) - 4H - benzo[4,5]cyclohepta[1,2-b]thiophen - 4 - ol.—Melting point 121–122° from ethanol or ethanol/hexane. The compound is produced in a manner analogous to that of the corresponding 9,10-dihydro compound described in FIGURE 7a.

(c) 4-(3 - dimethylamino - propylidene) - 4H - benzo[4,5]cyclohepta[1,2-b]thiophene.—A solution of 4 g. of the compound obtained above in 250 cc. of acetic anhydride is heated to the boil for 6 hours. After approximately 200 cc. of solvent have been distilled off the residue is poured into 1200 cc. of water under stirring, the aqueous solution is filtered through highly purified diatomaceous earth, made strongly alkaline with a 20% sodium hydroxide solution and the alkaline solution is extracted thrice with ether. The combined ether extracts which have been washed with water and dried over magnesium sulphate are then evaporated. The resulting residue is distilled in a high vacuum, whereby 4-(3-dimethylamino - propylidene) - 4H - benzo[4,5]cyclohepta[1,2-b]thiophene distills over at 160–165°/0.1 mm. Hg.

(d) 4-(3 - methyl - 3 - ethoxycarbonylamino - propylidene) - 4H - benzo[4,5]cyclohepta[1,2 - b]thiophene ($n_D^{25}$=1.6075) is obtained from 4.46 g. of 4 - (3-dimethylamino - propylidene) - 4H - benzo[4,5] cyclohepta[1,2-b]thiophene and 5.1 g. of chloroformic acid ethyl ester in 40 cc. of absolute benzene in a manner analogous to that described in Example 7c.

(e) 4-(3 - methylamino - propylidene) - 4H - benzo[4,5]cyclohepta[1,2-b]thiophene is obtained by heating 4.2 g. of 4 (3-methyl-3-ethoxycarbonylamino-propylidene) - 4H - benzo[4,5]cyclohepta[1,2-b]thiophene and 3.40 g. of potassium hydroxide in 40 cc. of n-butanol.

Hydrochloride: An isopropanolic hydrogen chloride solution is added to a solution of the base in isopropanol. After several hours the precipitated hydrochloride is recrystallized from ethanol/isopropanol. Melting point 219–220° (decomposition).

Example 10.—Preparation of 6-chloro-4-(3-methylaminopropylidene) - 4H - benzo[4,5]cyclohepta[1,2-b]thiophene (a) 1.0 g. of magnesium which has been activated with iodine is covered with tetrahydrofuran and a few drops of ethylene bromide are added. After the reaction has commenced a solution of 4.5 g. of 3-dimethylaminopropyl chloride in 10 cc. of tetrahydrofuran is added dropwise at such a rate that the solvent boils and heating to the boil is effected for a further 2 hours. A solution of 3.8 g. of 6-chloro-4H-benzo[4,5]cyclohepta[1,2-b]thiophen-4-one in 15 cc. of tetrahydrofuran is then added dropwise at 20° during the course of 5 minutes and heating to the boil is effected for a further half hour under stirring. After cooling, the reaction mixture is poured into 200 cc. of a 20% ammonium chloride solution and the aqueous solution is shaken out thrice with ether. The combined ether extracts are washed twice more with water, dried over sodium sulphate and the solvent is evaporated at 15 mm. Hg. The oily residue is crystallized from ethanol. 6-chloro-4-(3-dimethylaminopropyl) - 4H - benzo[4,5]cyclohepta[1,2-b]thiophen-4-ol melts at 164–165°.

(b) A solution of 8.0 g. of 6-chloro-4-(3-dimethylamino - propyl) - 4H - benzo[4,5]cyclohepta[1,2-b]thiophen-4-ol in 10 cc. of isopropanol, 50 cc. of ethanol and 10 cc. of a 6 N isopropanolic hydrochloric acid is stirred at 80° for half an hour. The solvent is evaporated at 15 mm. Hg and the residue is dissolved in 3 cc. of acetone. On standing the 6-chloro-4-(3-dimethylaminopropylidene) - 4H-benzo[4,5]cyclohepta[1,2-b]thiophene hydrochloride precipitates; it is filtered off and recrystallized from isopropanol. Melting point 183–186° (decomposition).

(c) A solution of 5.0 g. of 6-chloro-4-(3-dimethylamino - propylidene) - 4H - benzo[4,5]cyclohepta[1,2-b]thiophene in 40 cc. of absolute benzene is added dropwise to a solution of 5.25 g. of chloroformic acid ethyl ester in 30 cc. of absolute benzene at 15–20° during the course of one-half hour. The mixture is subsequently heated to boiling for 2 hours under stirring and after cooling, washing is effected thrice with 2 N hydrochloric acid, then twice more with water and the benzene solution is dried with magnesium sulphate. After evaporating the solvent pure 6-chloro-4-(3-methyl-3-ethoxycarbonylamino - propylidene) - 4H - benzo[4,5]cyclohepta[1,2-b]thiophene is obtained. $n_D^{25}$ 1.6095.

(d) A solution of 5.4 g. of 6-chloro-4-(3-methyl-3-ethoxycarbonylamino) - propylidene - 4H - benzo[4,5]cyclohepta[1,2-b]thiophene and 3.7 g. of potassium hydroxide in 40 cc. of n-butanol is heated to boiling in an atmosphere of nitrogen for 5 hours under stirring. The solvent is subsequently evaporated at 15 mm. Hg, the residue is dissolved at 60° in a mixture of 65 cc. of 2 N sulphuric acid and 55 cc. of water and the solution is cooled. The acid solution is then shaken out with 55 cc. of hexane, whereby three layers are obtained. The two lower layers are separated and the upper hexane layer is washed once more with 20 cc. of 2 N sulphuric acid. The combined aqueous solutions are made strongly alkaline with sodium hydroxide solution and shaken out thrice with ether. The combined ethereal extracts which have been washed with water and dried over magnesium sulphate are then evaporated. The resulting residue is then dissolved in isopropanol and an isopropanolic hydrogen chloride solution is added to the resulting solution. After several hours at room temperature 6-chloro-4 - (3 - methylamino - propylidene)-4H-benzo[4,5]cyclohepta[1,2-b]thiophene hydrochloride is filtered off and recrystallized from isopropanol. Melting point 253–255° (decomposition).

Example 11.—Preparation of 4-(2-dimethylamino-ethylidene) - 9,10 - dihydro - 4H - benzo[4,5]cyclohepta[1,2-b]thiophene (a) 4-hydroxy-4-(N,N-dimethylcarbamoyl-methyl)-9,10-dihydro - 4H - benzo[4,5]cyclohepta[1,2-b]thiophene.—Approximately 0.03 g. of ferric nitrate are added to 100 ml. of liquid ammonia followed by 0.49 g. of lithium. The resulting dark blue mixture is stirred for thirty minutes at −35° C., and 4.0 g. of N,N-dimethylacetic acid amide are added to the lithium amide suspension. After stirring the mixture for thirty minutes at −35°, a solution of 5 g. of 9,10-dihydro-4H-benzo[4,5]cyclohepta[1,2-b]thiophene-4-one in 15 ml. of absolute ether are added dropwise and the mixture is stirred for an additional two hours. 4.2 g. of ammonium chloride and 50 ml. of ether are then added portion wise to the reaction mixture. After evaporation of the ammonia, the temperature having risen to +10°, 300 ml. of ice water and 100 ml. of dichloromethane are stirred into the reaction mixture. The organic layer is separated off, dried over sodium sulphate and evaporated. The residue is recrystallized from isopropanol. Melting point: 105°–107° C.

(b) 4 - hydroxy - 4-(2-dimethylamino-ethyl)-9,10-dihydro-4H-benzo[4,5]cyclohepta[1,2-b]thiophene.—A solution of 5.0 g. of 4-hydroxy-4-(N,N-dimethylcarbamoyl-methyl) - 9,10 - dihydro-4H-benzo[4,5]cyclohepta[1,2-b]thiophene in 15 ml. of absolute tetrahydrofuran is added dropwise to a suspension of 2.15 g. of lithium aluminium hydride in 15 ml. of absolute tetrahydrofuran while stirring at 5–10°. The mixture is subsequently heated to boiling under reflux for one additional hour, cooled and 11 ml. of a saturated sodium sulphate solution are added while cooling. The resulting precipitate is filtered off and boiled several times with tetrahydrofuran. The combined solutions are evaporated, the residue taken up in 40 ml. of ether and the solution extracted with 2 N tartaric acid. The tartaric acid extract is then made alkaline with a 30% sodium hydroxide solution and the oily base is taken up with ether. After drying over potassium carbonate and evaporation of the solvent, the base is obtained as a viscous, almost colourless resin.

Tartrate: A warm solution of 1.12 g. of tartaric acid in 7 ml. of ethanol is added to a solution of 3.8 g. of the base in 5 ml. of ethanol. Upon cooling the neutral tartrate crystallizes. Melting point 181–182° upon recrystallization a number of times from ethanol.

(c) 4 - (2 - dimethylamino - ethylidene)-9,10-dihydro-4H-benzo[4,5]cyclohepta[1,2-b]thiophene.—17 ml. of concentrated hydrochloric acid are added to a solution of 3.8 g. of 4-hydroxy-4-(2-dimethylaminoethyl)-9,10-dihydro-4H-benzo[4,5]cyclohepta[1,2-b]thiophene in 50 ml. of glacial acetic acid and the mixture is evaporated to dryness at a pressure of 12 mm. Hg. The residue is taken up in 20 ml. of ethanol, the solvent evaporated and the residue dissolved in acetone. Upon addition of 1–2 ml. of ether, the hydrochloride of the cis-trans isomer mixture crystallizes from the acetone solution. A pure isomer, having a melting point of 218–221° (decomposition) is obtained by crystallization from acetone/ether and dichloromethane/ether.

Example 12.—Preparation of 4-[2-(1-pyrrolidinyl)-ethylidene] - 9,10 - dihydro-4H-benzo[4,5]cyclohepta[1,2-b]thiophene (a) 4 - hydroxy - 4-[(1-pyrrolidinyl)-carbonyl-methyl]-9,10 - dihydro - 4H - benzo[4,5]cyclohepta[1,2-b]thiophene.—The above mentioned compound is produced in a manner analogous to that described in Example 11a by utilizing 5.2 grams of 1-acetyl-pyrrolidine in place of N,N-dimethylacetic acid amide. By recrystallizing a number of times from isopropanol and acetone, the analytically pure compound results. Melting point 170.5–171.5°.

(b) 4 - hydroxy-4-[2-(1-pyrrolidinyl)-ethyl]-9,10-dihydro - 4H - benzo[4,5]cyclohepta[1,2-b]thiophene.—The above mentioned compound is obtained in a manner analogous to that described in Example 11b from a suspension of 5.42 grams of 4-hydroxy-4-[(1-pyrrolidinyl)-carbonyl-methyl] - 9,10 - dihydro-4H-benzo[4,5]cyclohepta-[1,2-b]thiophene in 30 ml. of absolute tetrahydrofuran. Instead of taking up the free base in ether, methylene chloride is utilized and the organic phase is dried over sodium sulphate. By recrystallizing from acetone, the analytically pure compound results. Melting point 139.5–141.5°.

(c) 4 - [2 - (1-pyrrolidinyl)-ethylidene]-9,10-dihydro-4H - benzo[4,5]cyclohepta - [1,2-b]thiophene.—The compound is obtained in a manner analogous to that described in Example 11c from 3.8 grams of 4-hydroxy-4-[2-(1-pyrrolidinyl)-ethyl]-9,10-dihydro - 4H - benzo[4,5]cyclohepta[1,2-b]thiophene. After evaporation of the solvent, the residue is crystallized from acetone. The hydrochloride crystallizes from the acetone solution in the form of the cis-trans isomer mixture. By crystallization from ethanol petroleum ether, the analytically pure cis-trans isomer mixture results. Melting point 208.5–209.5°.

Example 13.—Preparation of 4-(2-piperidino-ethylidene)-9,10 - dihydro - 4H - benzo[4,5]-cyclohepta[1,2-b]thiophene (a) 4 - hydroxy - 4-(piperidino-carbonyl-methyl)-9,10-dihydro - 4H - benzo-[4,5]cyclohepta[1,2-b]thiophene.—The above mentioned compound is produced in a manner analogous to that described in Example 11a from 5.82 grams of 1-acetyl-piperidine. By recrystallizing a number of times from isopropanol the analytically pure compound results. Melting point 136–137°.

(b) 4 - hydroxy - 4-(2-piperidino-ethyl)-9,10-dihydro-4H - benzo[4,5]-cyclohepta[1,2-b]thiophene.—The compound is obtained in a manner analogous to that described in the Example 11b by utilizing a solution of 5.66 grams of 4 - hydroxy - 4 - (piperidino-carbonyl-methyl)-9,10-dihydro-4H-benzo[4,5]cyclohepta[1,2-b]thiophene in 30 ml. of absolute tetrahydrofuran. The extraction is effected with 2 N hydrochloric acid instead of 2 N tartaric acid and the free base is taken up in methylene chloride and is dried over sodium sulphate. After recrystallization from benzene, the analytically pure compound results. Melting point 185–186.5°.

(c) 4 - (2-piperidino-ethylidene)-9,10-dihydro-4H-benzo[4,5]cyclohepta-[1,2-b]thiophene.—The above mentioned compound is produced in a manner analogous to that described in Example 11c from 3.8 grams of 4-hydroxy-4-(2 - piperidino-ethyl) - 9,10-dihydro-4H-benzo[4,5]cyclohepta[1,2-b]thiophene. Upon evaporation of the solvent, the residue is crystallized from acetone. The hydrochloride of the cis-trans isomer mixture crystallizes from the acetone solution.

Recrystallization from methanol yields an isomer having a melting point of 220.5–221.5° (decomposition).

Example 14.—Preparation of 4-[2-(2-piperidyl)-ethylidene] - 9,10-dihydro-4H-benzo[4,5]cyclohepta[1,2-b]thiophene (a) 4-(2-[1-ethoxycarbonyl-2-piperidyl]-ethylidene - 9,10-dihydro-4H-benzo[4,5]cyclohepta[1,2-b]thiophene. — A solution of 2.5 g. of 4-(2-[1-methyl-2-piperidyl]-ethylidene) - 9,10 - dihydro - 4H-benzo[4,5]cyclohepta[1,2-b]thiophene in 15 cc. of absolute benzene is added to a solution of 2.6 g. of chloroformic acid ethyl ester in 15 cc. of absolute benzene and the resulting solution is left standing at room temperature for 24 hours. The solution is subsequently washed three times with N hydrochloric acid, then three more times with water and dried over sodium sulphate. After evaporating the solvent pure 4-(2-[1-ethoxycarbonyl - 2 - piperidyl]-ethylidene)-9,10-dihydro-4H - benzo[4,5]cyclohepta[1,2-b]thiophene is obtained. $n_D^{25}$=1.5772.

(b) 4 - [2 - (2-piperidyl)-ethylidene]-9,10-dihydro-4H-benzo[4,5]cyclohepta[1,2-b]thiophene.—A solution of 2.0 g. of the above compound and 25 cc. of 48% hydrobromic acid in 50 cc. of glacial acetic acid is heated to the boiling point in an atmosphere of nitrogen for 20 minutes. After cooling, the reaction solution is poured into 250 cc. of ice water, the solution is made strongly alkaline with sodium hydroxide solution and extracted three times with methylene chloride. The organic extracts are washed with water, dried over sodium sulphate and the solvent is evaporated at reduced pressure.

Hydrochloride: The calculated amount of isopropanolic hydrochloric acid solution is added to a solution of the residue in isopropanol. The precipitated salt is filtered off and recrystallized from isopropanol. The hydrochloride (mixtuer of isomers) has a melting point of 244–247° (decomposition).

Example 15.—Preparation of 4-(3-methylamino-2-methyl-propylidene) - 9,10 - dihydro-4H-benzo[4,5]cyclohepta[1,2-b]thiophene (a) 4 - [3-(N-methyl-N-ethoxycarbonylamino)-2-methyl - propylidene] - 9,10-dihydro-4H-benzo[4,5]cyclohepta[1,2-b]thiophene.—A solution of 1.8 g. of 4-(3-dimethylamino - 2 - methyl - propylidene)-9,10-dihydro-4H-benzo[4,5]cyclohepta[1,2-b]thiophene in 15 cc. of absolute benzene is added dropwise at room temperature during the course of 15 minutes to a solution of 2.0 g. of chloroformic acid ethyl ester in 15 cc. of absolute benzene. The reaction mixture is subsequently heated to the boiling point for an additional 2 hours under stirring. After cooling, washing is effected three times with N hydrochloric acid and then twice more with water and the benzene solution is dried over sodium sulphate. After evaporating the solvent, pure 4 - [3-(N-methyl-N-ethoxycarbonylamino)-2-methyl-propylidene]-9,10-dihydro - 4H - benzo[4,5]cyclohepta[1,2-b]thiophene is obtained, $n_D^{25}$=1.5700.

(b) 4 - (3 - methylamino-2-methyl-propylidene)-9,10-dihydro - 4H - benzo[4,5]cyclohepta[1,2-b]thiophene.—A solution of the compound obtained in (a) above in 15 cc. of n-butanol and 1.5 g. of potassium hydroxide is heated to the boiling point in an atmosphere of nitrogen under stirring for 5 hours. After cooling, 20 cc. of toluene are added and washing is effected five times with water. The organic solution is subsequently extracted three times with aqueous 2 N tartaric acid, the tartaric acid solution is made alkaline with sodium hydroxide solution under cooling and is extracted with methylene chloride. The extract is subsequently washed with water, dried over sodium sulphate and the solvent is evaporated.

Hydrochloride: The calculated amount of hydrochloric acid dissolved in acetone is added to a solution of the crude base in acetone, the precipitate hydrochloride is filtered off after some time and is recrystallized from acetone. The hydrochloride has a melting point of 194–195° (decomposition).

Example 16.—Preparation of 4-[2-(2-piperidyl)-ethylidene]4H-benzo[4,5]cyclohepta[1,2-b]thiophene (a) 4 - [2 - (1 - ethoxycarbonyl - 2 - piperidyl) - ethylidene]4H - benzo[4,5]cyclohepta[1,2 - b]thiophene.—A solution of 1.7 g. of 4-[2-(1-methyl-2-piperidyl)-ethylidene] - 4H-benzo[4,5]cyclohepta[1,2 - b]thiophene in 10 cc. of absolute benzene is added dropwise at room temperature during the course of 15 minutes in an atmosphere of nitrogen to a solution of 1.8 g. of chloroformic acid ethyl ester in 10 cc. of absolute benzene. The mixture is subsequently heated to the boiling point for 2 hours under stirring. After cooling, washing is effected with N hydrochloric acid and with water and the benzene solution is dried over sodium sulphate. After evaporating the benzene solution, pure 4-[2-(1-ethoxycarbonyl-2-piperidyl) - ethylidene] - 4H - benzo[4,5]cyclohepta[1,2-b]thiophene is obtained in the form of an oil. $n_D^{25}$=1.6350.

(b) 4 - [2 - (2 - piperidyl)-ethylidene] - 4H - benzo[4,5]cyclohepta[1,2-b]thiophene.—A solution of 1.6 g. of the product from step (a) above, 1.8 g. of potassium hydroxide and 20 cc. of methyl-isobutyl carbinol is heated to 140° in an atmosphere of nitrogen under stirring for 8 hours. After cooling, the resulting solution is washed five times with water and extracted four times with 2N tartaric acid. The acid extracts are made alkaline with concentrated sodium hydroxide solution under good cooling and are extracted three times with methylene chloride. The combined methylene chloride extracts are subsequently washed with water and dried over magnesium sulphate. After evaporating the solvent 4-[2-(2-piperidyl)-ethylidene]-4H-benzo[4,5]cyclohepta[1,2 - b]thiophene is obtained as a yellowish oil.

Hydrochloride: An isopropanolic solution of the base is acidified with isopropanolic hydrochloric acid solution and the resulting solution is left standing at 0°. After several hours the precipitated hydrochloride is filtered off and recrystallized from isopropanol. Melting point 253.5–255.5° (decomposition).

Example 17.—Preparation of 4 - (3 - dimethylamino-propyl) - 9,10 - dihydro - 4H-benzo[4,5]cyclohepta[1,2b]thiophene 12.0 g. of red phosphorus and 64 cc. of 56% hydriodic acid are added to a solution of 12.4 g. of 4-(3-dimethylamino-propylidene)-9,10-dihydro - 4H - benzo[4,5]cyclohepta[1,2-b]thiophene hydrochloride in 240 cc. of glacial acetic acid and the mixture is heated to 120° under stirring for 15 minutes. The reaction mixture is subsequently filtered and the filtrate is evaporated at reduced pressure. The oily residue is dissolved in 20% sodium hydroxide solution and methylene chloride, the organic phase is separated and the aqueous portion is then extracted twice with methylene chloride. The combined methylene chloride extracts are washed twice with 5% sodium thiosulphate then twice with water, dried over potassium carbonate and evaporated at reduced pressure. The calculated amount of hydrogen chloride in acetone is then added to a solution of the residue in 35 cc. of acetone and the solution is slowly allowed to cool to room temperature. The precipitated hydrochloride is filtered off and crystallized from acetone. Melting point 158.5–160°.

Example 18.—Preparation of 4-(3-piperidino-propyl)-9, 10 - dihydro - 4H - benzo[4,5]cyclohepta[1,2 - b]thiophene 0.7 g. of red phosphorus and 50 cc. of 56% hydriodic acid are added to a solution of 1.0 g. of 4-hydroxy-4-(3-piperidino-propyl)-9,10 - dihydro - 4H - benzo[4,5]cyclohepta[1,2-b]thiophene in 16 cc. of glacial acetic acid and the mixture is heated to 120° under stirring for 10 minutes. The reaction mixture is subsequently filtered and the filtrate evaporated at reduced pressure. The oily residue is extracted with 20% sodium hydroxide solution and methylene chloride, the organic phase is separated and the aqueous portion is extracted twice more with methylene chloride. The combined methylene chloride extracts are washed twice with 5% sodium thiosulphate solution, then twice with water, dried over potassium carbonate and evaporated at reduced pressure. The calculated amount of oxalic acid in acetone is then added to a solution of the residue in acetone and the solution is slowly allowed to cool to room temperature. The precipitated hydrogen oxalate melts at 195–196.5° (decomposition) after recrystallization from ethanol.

Example 19.—Preparation of 4-β-dimethylaminopropyl)-9,10 - dihydro - 4H - benzo[4,5]cyclohepta[1,2 - b]thiophene The substance prepared in Example 17 may also be prepared from 12.0 g. of 4-hydroxy-4-(3-dimethylaminopropyl) - 9,10 - dihydro - 4H - benzo[4,5]cyclohepta[1,2-b]thiophene, 12.0 g. of red phosphorus, 64 cc. of 56% hydriodic acid and 180 cc. of glacial acetic acid by heating to 120° for 15 minutes in a manner analogous to that described in Example 18. The hydrochloride melts at 158.5–160° after recrystallization from acetone.

The following compounds may be produced by the same process:

TABLE I 4-(R)-9,10-dihydro-4H-benzo[4,5]cyclohepta[1,2-b]thiophene

| Example | R | Melting point recrystallized from— |
| --- | --- | --- |
| 20 | 3-dimethylamino-2-methyl-propyl. | Hydrochloride of the mixture of diastereoisomers: 186.5–188.5° (decomposition), isopropanol. |
| 21 | 2-(1-methyl-2-piperidyl)-ethyl. | Hydrochloride of the mixture of diastereoisomers: 208.5–210.5° (decomposition), acetone. |
| 22 | (1-methyl-3-piperidyl)-methyl. | Hydrogen oxalate: 205.5–208.5° (decomposition), ethanol. |
| 23 | 3-(4-methyl-piperazinyl)-propyl. | Dihydrogen maleate: 178–180° (decomposition), methanol/ethanol. |

Example 24.—Preparation of 4-hydroxy-4-[3-(4-methyl-piperazinyl)-propyl]-9,10-dihydro - 4H - benzo[4,5]cyclohepta[1,2-b]thiophene The substance used as a starting material in Example 23 is prepared as follows:

(a) 2.2 g. of iodine activated magnesium are covered with a layer of absolute tetrahydrofuran and a few drops of ethylene bromide are added. After the reaction has commenced, a solution of 14 g. of 3-(4-methyl-piperazinyl)-propyl chloride in 10 cc. of absolute tetrahydrofuran is added dropwise at such a rate that the solvent boils. After heating at reflux for 6 hours, a solution of 8.2 g. of 9,10 - dihydro - 4H - benzo[4,5]cyclohepta[1,2 - b]thiophene-4-one in 20 cc. of absolute tetrahydrofuran is added dropwise during the course of 15 to 20 minutes and heating to boiling is effected for an additional 15 minutes. After cooling, the reaction mixture is poured into a solution of 50 g. of ammonium chloride in 250 cc. of water, 200 cc. of chloroform are added and the entire material is filtered through highly purified diatomaceous earth. After separating the organic phase, the aqueous portion is extracted twice more with chloroform, the combined chloroform extracts are again washed with water, dried over magnesium sulphate and the solvent is evaporated at 15 mm. of Hg. The residue is recrystallized from hexane. The compound has a melting point of 151–152°.

Example 25.—Preparation of 4-(3-methylamino-propyl)-9,10-dihydro-4H-benzo[4,5]cyclohepta[1,2-b]thiophene 12.0 g. of red phosphorus and 64 cc. of 56% hydriodic acid are added to a solution of 12.0 g. of 4-(3-methylamino-propylidene) - 9,10 - dihydro - 4H-benzo[4,5]cyclohepta[1,2-b]thiophene hydrochloride in 240 cc. of glacial acetic acid and the mixture is heated under reflux for 5 minutes. The reaction mixture is sebsequently filtered and the filtrate is evaporated at reduced pressure. The oily residue is dissolved in 20% sodium hydroxide solution and methylene chloride, the organic phase is separated and the aqueous portion is extracted twice more with methylene chloride. The combined methylene chloride extracts are washed twice with 5% sodium thiosulphate solution and then twice more with water, dried over potassium carbonate and evaporated at reduced pressure. The calculated amount of ethanolic hydrochloric acid is then added to a solution of the residue in 20 cc. of ethanol. The hydrochloride which crystallizes out is recrystallized from ethanol. Melting point 210.5–212°.

Example 26.—Preparation of 4-(3-methylamino - 2-methyl - propyl) - 9,10 - dihydro-4H-benzo[4,5]cyclohpeta[1,2-b]thiophene This compound is obtained from 0.7 g. of 4-(3-methylamino - 2 - methyl-propylidene)-9,10-dihydro-4H-benzo[4,5]cyclohepta]1,2-b[thiophene, 1.0 g. of red phosphorus, 5.6 cc. of 56% hydriodic acid and 20 cc. of glacial acetic acid by heating under reflux for 10 minutes in a manner analogous to that described in Example 25. The pure hydrogen oxalate melts at 178–180° (decomposition) after recrystallization from methanol/ethanol.

The 4-(3-methylamino - 2 - methyl - propylidene)-9, 10 - dihydro - 4H - benzo[4,5]cyclohepta[1,2 - b]thiophene used as starting material is produced as follows:

(a) A solution of 1.8 g. of 4-(3-dimethylamino-2-methyl - propylidene) - 9,10 - dihydro - 4H - benzo[4, 5]cyclohepta[1,2-b]thiophene in 15 cc. of absolute benzene is added dropwize at room temperature during the course of 15 minutes to a solution of 2.0 g. of chloroformic acid ethyl ester in 15 cc. of absolute benzene. The reaction mixture is sebsequently heated to boiling for two hours under stirring. After cooling, washing is effected three times with N hydrochloric acid and then twice with water and the benzene solution is dried over sodium sulphate. After evaporating the solvent, pure 4-(3-(N-methyl - N - ethoxycarbonylamino) - 2 - methylpropylidene[-9,10 - dihydro - 4H - benzo[4,5]cyclohepta [1,2-b]thiophene is obtained. n25/D=1.5700.

(b) A solution of 1.7 g. of 4-[3-(N-methyl-N-ethoxycarbonylamino) - 2 - methyl - propylidene] - 9,10-dihydro - 4H - benzo[4,5]cyclohepta[1,2-b]thiophene, 1.5 g. of potassium hydroxide and 15 cc. of n-butanol is heated to boiling under stirring for 5 hours in an atmosphere of nitrogen. After cooling, 20 cc. of toluene are added and washing is effected five times with water. The organic solution is then shaken out three times with 2 N tartaric acid, the tartaric acid solution is made alkaline with sodium hydroxide solution under cooling and is extracted with methylene chloride. The methylene chloride extract is subsequently washed with water, dried over sodium sulphate and the solvent is evaporated.

Hydrochloride: The calculated amount of hydrochloric acid dissolved in acetone is added to a solution of the crude base in acetone, let stand, and the precipitated hydrochloride is filtered off and recrystallized from acetone; melting point of 194–195.5° (decomposition).

This compound is also obtained by reaction of 4-(3-dimethyl - amino - 2 - methyl - propyl) - 9,10 - dihydro - 4H - benzo[4,5]cyclohepta[1,2-b]thiophene, prepared as described in Example 20, with chloroformic acid ethyl ester and subsequent hydrolysis in a manner analogous to that described in Example 28. The pure hydrogen oxalate has a melting point of 178–180° (decomposion) after recrystallization from methanol/ethanol.

Example 27.—Preparation of 4 - [2 - (2 - pipperidyl)-ethyl]-9,10 - dihydro - 4H - benzo[4,5]cyclohepta[1,2-b]thiophene This compound is obtained from 1.0 g. of 4-[2-(2-piperidyl) - ethylidene] - 9,10 - dihydro - 4H - benzo-[4.5]cyclohepta[1,2-b]thiopene, 1.0 g. of red phosphorus, 5.6 cc. of 56% hydriodic acid and 20 cc. of glacial acetic acid by heating under reflux 10 minutes in a manner analogous to that descibed in Example 26. The resulting base is distilled in a high vacuum, whereby the mixture of diastereoisomers distills at 165–170° and a pressure of 0.08 mm Hg in the form of a yellowish oil.

Hydrochloride: The calculated amount of hydrochloric acid dissolved in acetone is added to a solution of the distilled base in acetone. After several hours the precipitated hydrochloride is filtered off and recrystallized from acetone. Melting point 164–169° (decomposition) (mixture of diasteroisomers).

The 4-[2-(2-piperidyl - ethylene] - 9,10 - dihydro-4H-benzo [4,5]cyclohepta[1,2-b]thiophene used as starting material, is produced as follows:

(a) A solution of 2.5 g. of 4-[2-(1-methyl-2-piperidyl( - ethylidene] - 9,10 - dihydro - 4H - benzo[4,5]cyclohepta[1,2-b]thiopene in 15 cc. of absolute benzene is added to a solution of 2.6 g. of cloroformic acid ethyl ester in 15 cc. of absolute benzene and the resulting solution is left to stand for 24 hours at room temperature. The solution is subsequently washed three times with N hydrochloric acid and then three more times with water and is dried over sodium sulphate. After evaporating the solvent, pure 4-[2 - (1 - ethoxycarbonyl - 2 - piperidyl)-ethylidene] - 9,10 - dihydro - 4H - benzo[4,5]cyclohepta[1,2-b]thiophene is obtained. n25/D=1.5772.

(b) A solution of 2.0 g. of 4-[2-(1-ethoxycarbonyl-2-piperidyl) - ethylidene] - 9,10 - dihydro - 4H - benzo [4,5]cyclohepta[1,2-b]thiopene and 25 cc. of 48% hydrobromic acid in 50 cc. of glacial acetic acid is heated to boiling in an atmosphere of nitrogen for 20 minutes. After cooling, the reaction mixture is poured into 250 cc. of ice water, the solution is made strongly alkaline with sodium hydroxide solution and is extracted three times with methylene chloride. The organic extracts are washed with water, dried over sodium sulphate and the solvent is evaporated at reduced pressure.

Hydrochloride: The calculated amount of hydrochloric acid dissolved in isopropanol is added to a solution of the residue in isopropanol. The precipitated salt is filtered off and recrystallized from isopropanol giving 4-[2 - (2 - piperidyl) - ethylidene] - 9,10 - dihydro - 4H-benzo[4,5]cyclohepta[1,2 - b]thiophene hydrochloride. Melting point 244–247° (decomposition), (mixture of diastereoisomers).

Example 28.—Preparation of 4-(3-methylamino-propyl)-9,10-dihydro-4H-benzo[4,5]cyclohepta[1,2-b]thiophene (a) 4-[3-(N-methyl-N-ethoxycarbonylamino)-propyl]-9,10 - dihydro - 4H - benzo[4,5]cyclohepta[1,2 - b]thiophene.—A solution of 18.0 g. of 4-(3-dimethylaminopropyl) - 9,10 - dihydro - 4H - benzo[4,5]cyclohepta[1,2-b]thiophene, prepared in Example 17 in 70 cc. of absolute benzene is added dropwise at room temperature during the course of one-half hour to a solution of 21.0 g. of chloroformic acid ethyl ester in 70 cc. of absolute benzene. Subsequently the reaction mixture is heated to boiling under stirring for an additional 5 hours. After cooling, washing is effected three times with 2 N hydrochloric acid and then twice more with water, and the solution is dried over magnesium sulphate. After evaporating the solvent, pure 4-[3-(N-methyl-N-ethoxycarbonylamino)-propyl]-9,10 - dihydro - 4H - benzo[4,5]cyclohepta[1,2 - b]thiophene is obtained. $n_D^{25}$=1.5745.

(b) 4-(3-methylaminopropyl)-9,10-dihydro-4H-benzo[4,5]cyclohepta[1,2-b]thiophene.—A solution of 16.5 g. of 4-[3-(N-methyl-N-ethoxy-carbonylamino)-propyl]-9,10 - dihydro - 4H - benzo[4,5]cyclohepta[1,2 - b]thiophene, 13.5 g. of potassium hydroxide and 140 cc. of n-butanol is heated to boiling under stirring in an atmosphere of nitrogen for 4 hours. Subsequently the solvent is evaporated, the residue is dissolved at 80° in a mixture of 140 cc. of water and 180 cc. of 2 N sulphuric acid and the solution is cooled. The solution is then extracted twice with hexane, the organic extract is extracted twice more with 2 N sulphuric acid, the aqueous extracts are made alkaline with sodium hydroxide solution under cooling and extracted three times with methylene chloride. After drying the combined methylene chloride extracts over magnesium sulphate, the solvent is evaporated at reduced pressure. The calculated amount of ethanolic hydrochloric acid is then added to a solution of the residue in 20 cc. of ethanol. The hydrochloride which crystallizes out on standing is recrystallized from ethanol. Melting point 210.5–212°.

(c) The splitting off of the ethoxycarbonyl radical from the compound produced in accordance with (a) above may also be effected with hydrogen bromide, as follows:

A solution of 2 g. of 4-[3-(N-methyl-N-ethoxy-carbonylamino) - propyl] - 9,10 - dihydro - 4H - benzo[4,5] cyclohepta[1,2-b]thiophene in 25 cc. of 48% hydrobromic acid is heated to boiling in an atmosphere of nitrogen for one half hour. The solution is then poured into 250 cc. of ice water, the resulting solution is made alkaline with sodium hydroxide solution and is extracted three times with methylene chloride. The organic extracts are washed with water, dried over sodium sulphate and the solvent is evaporated. The calculated amount of ethanolic hydrochloric acid is then added to a solution of the residue in ethanol. After some time the hydrochloride crystallizes. Melting point 210.5–212° from ethanol.

Example 29.—Preparation of 4-[2-(2-piperidyl)-ethyl]-9,10-dihydro-4H-benzo[4,5]cyclohepta[1,2-b]thiophene This compound is obtained by reaction of 4-[2-(1-methyl - 2 - piperidyl) - ethyl] - 9,10 - dihydro - 4H - benzo[4,5]cyclohepta[1,2-b]thiophene prepared as described in Example 21 with chloroformic acid ethyl ester and subsequent hydrolysis in a manner analogous to that described in Example 28. The mixture of diastereoisomers distills at 165–170° and pressure of 0.08 mm. of Hg in the form of a yellowish oil.

Hydrochloride: The calculated amount of hydrochloric acid dissolved in acetone is added to a solution of the distilled base in acetone. After several hours the precipitated hydrochloride is filtered off and crystallized from acetone. Melting point 164–169° (decomposition) (mixture of diastereoisomers).

What is claimed is:
1. A compound of the formula

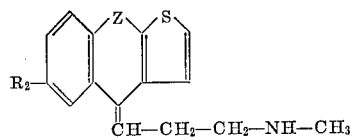

wherein
Z is —CH$_2$—CH$_2$— or —CH=CH—; and
R$_2$ is hydrogen, chlorine or bromine;
or a physiologically acceptable acid addition salt thereof.

2. The compound of claim 1 which is 4-(3-methylaminopropylidene) - 9,10 - dihydro - 4H - benzo[4,5]cyclohepta[1,2-b]thiophene.

3. The compound of claim 1 which is 6-chloro-4-(3-methylaminopropylidene) - 9,10 - dihydro - 4H - benzo[4,5]cyclohepta[1,2-b]thiophene.

4. The compound of claim 1 which is 4-(3-methyl-amino - propylidene) - 4H - benzo[4,5]cyclohepta[1,2-b] thiophene.

5. The compound of claim 1 which is 6-chloro-4-(3-methylamino - propylidene) - 4H - benzo[4,5]cyclohepta [1,2-b]thiophene.

6. A compound of the formula:

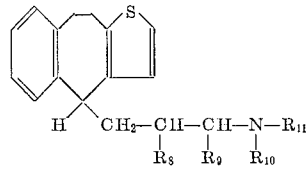

wherein: $R_8$, $R_9$, $R_{10}$, and $R_{11}$ are selected from the groupings consisting of:

(1) $R_8$ is hydrogen or methyl, $R_9$ is hydrogen, $R_{10}$ is alkyl of 1 to 4 carbon atoms and $R_{11}$ is hydrogen or alkyl of 1 to 4 carbon atoms;

(2) $R_8$ is hydrogen or methyl, $R_9$ is hydrogen, $R_{10}$ and $R_{11}$ together with the nitrogen atom form a 1-pyrrolidinyl, 1-piperidinyl, or 1-(4-$C_1$-$C_4$ alkyl)-piperazinyl heterocyclic ring;

(3) $R_8$ and $R_{10}$ together are dimethylene or trimethylene, $R_9$ is hydrogen, and $R_{11}$ is alkyl of 1 to 4 carbon atoms or hydrogen;

(4) $R_8$ is hydrogen, $R_9$ and $R_{10}$ together are trimethylene or tetramethylene, and $R_{11}$ is hydrogen or alkyl of 1 to 4 carbon atoms;

wherein, when $R_8$, $R_9$, $R_{10}$ and $R_{11}$ are as defined in (3) above, the nitrogen is part of a ring which is a member selected from the group consisting of 3-pyrrolidinyl and 3-piperidinyl, and when $R_8$, $R_9$, $R_{10}$ and $R_{11}$ are as defined in (4) above, the nitrogen is part of a ring which is a member selected from the group consisting of 2-piperidinyl and 2-pyrrolidinyl; or a physiologically acceptable acid addition salt thereof.

7. The compound of claim 6 which is 4-3-dimethylaminopropyl) - 9,10 - dihydro - 4H - benzo[4,5]cyclohepta[1,2-b]thiopene.

8. The compound of claim 6 which is 4-(3-piperidinopropyl) - 9,10 - dihydro - 4H - benzo[4,5]cyclohepta[1,2-b]thiophene.

9. The compound of claim 6 which is 4-(3-dimethylamino - 2 - methyl - propyl) - 9,10 - dihydro - 4H - benzo-[4,5]cyclohepta[1,2-b]thiophene.

10. The compound of claim 6 which is 2-(1-methyl-2-piperidyl) - ethyl - 9,10 - dihydro - 4H - benzo[4,5]-cyclohepta[1,2-b]thiophene.

11. The compound of claim 6 which is (1-methyl-3-piperidyl) - methyl - 9,10 - dihydro - 4H - benzo[4,5]-cyclohepta[1,2-b]thiophene.

12. The compound of claim 6 which is 3-(4-methylpiperazinyl) - propyl - 9,10 - dihydro - 4H - benzo[4,5]-cyclohepta[1,2-b]thiophene.

13. The compound of claim 6 which is 4-(3-methylaminopropyl) - 9,10 - dihydro - 4H - benzo[4,5]cyclohepta[1,2-b]thiophene.

14. The compound of claim 6 which is 4-(3-methylamino - 2 - methylpropyl) - 9,10 - dihydro - 4H - benzo-[4,5]cyclohepta[1,2-b)]thiophene.

15. The compound of claim 6 which is 4-[2-(2-piperidyl) - ethyl] - 9,10 - dihydro - 4H - benzo[4,5]cyclohepta-[1,2-b]thiophene.

16. A compound of the formula:

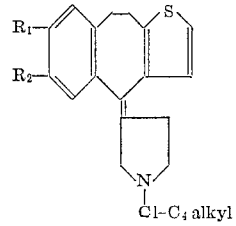

wherein $R_1$ and $R_2$ are each hydrogen, chlorine or bromine, with the proviso that when one of $R_1$ and $R_2$ is chlorine or bromine, the other must be hydrogen; or a physiologically acceptable acid addition salt thereof.

17. The compound of claim 16, which is 4-[1-methylpyrrolidinylidene - 3) -] - 9,10 - dihydro - 4H - benzo-[4,5]cyclohepta[1,2-b]thiophene.

18. The compound of claim 16, which is 7-chloro-4-[1 - methylpyrrolidinylidene - (3)] - 9,10 - dihydro - 4H-benzo[4,5]cyclohepta[1,2-b]thiophene.

19. The comopund of claim 16, which is 6-chloro-4-[1 - methylpyrrolidinylidene - (3)] - 9,10 - dihydro - 4H-benzo[4,5]cyclohepta[1,2-b]thiophene.

20. A compound of the formula:

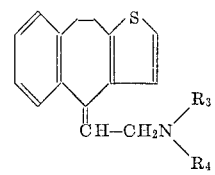

wherein: $R_3$ and $R_4$ may be similar or dissimilar and represent an alkyl radical of from 1–4 carbon atoms, inclusive, or $R_3$ and $R_4$ together with the nitrogen atom represent 1-pyrrolidinyl or 1-piperidinyl; or a physiologically acceptable acid addition salt thereof.

21. The compound of claim 20 which is 4-(2-dimethylaminoethylidene) - 9,10 - dihydro - 4H - benzo[4,5]cyclohepta[1,2-b]thiophene.

22. The compound of claim 20 which is 4-[2-(1-pyrrolidinyl) - ethylidene] - 9 ,10 - dihydro - 4H - benzo [4,5]cyclohepta[1,2-b]thiophene.

23. The compound of claim 20 which is 4-(2-piperidinoethylidene) - 9,10 - dihydro - 4H - benzo[4,5]cyclohepta-[1,2-b]thiophene.

24. A compound of the formula:

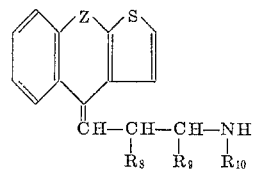

wherein:

Z is —$CH_2$ —$CH_2$— or —CH=CH—; and $R_8$, $R_9$, and $R_{10}$ are selected from the groupings consisting of:

(1) $R_8$ is methyl, $R_9$ is hydrogen, and $R_{10}$ is alkyl of 1 to 4 carbon atoms;

(2) $R_8$ and $R_{10}$ together are dimethylene or trimethylene, $R_9$ is hydrogen; and (3) $R_8$ is hydrogen, and $R_9$ and $R_{10}$ together are trimethylene or tetramethylene;

or a physiologically acceptabe acid addition salt thereof.

25. The compound of claim 24 which is 4-[2-(2-piperidyl) - ethylidene] - 9,10 - dihydro - 4H - benzo[4,5]cyclohepta[1,2-b]thiophene.

26. The compound of claim 24 which is 4-(3-methylamino - 2 - methyl - propylidene) - 9,10 - dihydro - 4H-benzo[4,5]cyclohepta[1,2-b]thiophene.

27. The compound of claim 24 which is 4-[2-(2-piperidyl) - ethylidene] - 4H - benzo[4,5]cyclohepta[1,2-b]thiophene.

28. A compound of the formula:

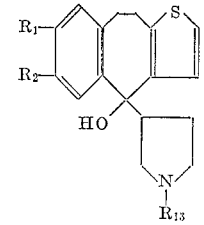

wherein

R$_{13}$ is alkyl of 1 to 4 carbon atoms, and each of

R$_1$ and R$_2$ is hydrogen, chlorine or bromine, with the proviso that when one of R$_1$ and R$_2$ is chlorine or bromine, the other must be hydrogen; or an acid addition salt thereof.

29. The compound of claim 28 which is 4-hydroxy-4-[1 - methyl - pyrrolidinyl - (3)] - 9,10 - dihydro - 4H-benzo[4,5]cyclohepta[1,2-b]thiophene.

30. The compound of claim 28 which is 7-chloro-4-hydroxy - 4 - [1 - methyl - pyrrolidinyl - (3)] - 9,10-dihydro-4H-benzo[4,5]cyclohepta[1,2-b]thiophene.

31. The compound of claim 28 which is 6-chloro-4-hydroxy - 4 - [1 - methyl - pyrrolidinyl - (3)] - 9,10 - dihydro-4H-benzo[4,5]cyclohepta[1,2-b]thiophene.

32. A compound of the formula:

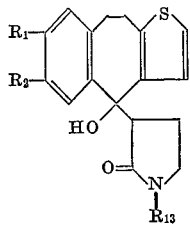

wherein

R$_{13}$ is alkyl of 1 to 4 carbon atoms, and each of

R$_1$ and R$_2$ is hydrogen, chlorine or bromine, with the proviso that when one of R$_1$ and R$_2$ is chlorine or bromine, the other must be hydrogen, or an acid addition salt thereof.

33. The compound of claim 32 which is 4-hydroxy-4-[1 - methyl - 2 - oxopyrrolidinyl - (3)] - 9,10 - dihydro-4H-benzo[4,5]cyclohepta[1,2-b]thiophene.

34. The compound of claim 32 which is 7-chloro-4-hydroxy - 4 - [1 - methyl - 2 - oxopyrrolidinyl - (3)]-9,10-dihydro-4H-benzo[4,5]cyclohepta[1,2-b]thiophene.

35. The compound of claim 32 which is 6-chloro-4-hydroxy - 4 - [1 - methyl - 2 - oxopyrrolidinyl - (3)] - 9,10-dihydro-4H-benzo[4,5]cyclohepta[1,2-b]thiophene.

36. A compound of the formula:

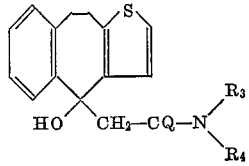

wherein $\mathrm{N}\begin{smallmatrix}R_3\\R_4\end{smallmatrix}$ is 1-pyrrolidinyl, 1-piperidinyl, or a dialkylamino group in which R$_3$ and R$_4$ are lower alkyl of 1 to 4 carbon atoms: and CQ is —CH$_2$— or —CO—;

or an acid addition salt thereof.

37. The compound of claim 36 which is 4-hydroxy-4-(N,N - dimethylcarbamoyl - methyl) - 9,10 - dihydro-4H-benzo[4,5]cyclohepta[1,2-b]thiophene.

38. The compound of 36 which is a 4-hydroxy-4-(2-dimethylamino - ethyl) - 9,10 - dihydro - 4H - benzo[4,5]-cyclohepta[1,2-b]thiophene.

39. The compound of claim 36 which is 4-hydroxy-4[(1-pyrrolidinyl) - carbonyl - methyl] - 9,10 - dihydro - 4H-benzo[4,5]cyclohepta[1,2-b]thiophene.

40. The compound of claim 36 which is 4-hydroxy-4-[2 - (1 - pyrrolidinyl) - ethyl] - 9,10 - dihydro - 4H-benzo[4,5]cyclohepta[1,2-b]thiophene.

41. The compound of claim 36 which is 4-hydroxy-4-(piperidinocarbonyl - methyl) - 9,10 - dihydro - 4H-benzo[4,5]cyclohepta[1,2-b]thiophene.

42. The compound of claim 36 which is 4-hydroxy-4-(2 - piperidino - ethyl) - 9,10 - dihydro - 4H - benzo[4,5]cyclohepta[1,2-b]thiophene.

References Cited

UNITED STATES PATENTS

| 3,306,897 | 2/1967 | Renz et al. | 260—240 |
| 3,275,640 | 9/1966 | Englehardt et al. | 260—293.4 |
| 3,272,826 | 9/1966 | Jucker et al. | 260—293.4 |
| 3,258,459 | 6/1966 | Yale et al. | 260—243 |

FOREIGN PATENTS

| 651,101 | 7/1964 | Belgium. |
| 6,408,529 | 2/1965 | Netherlands. |
| 6,414,607 | 6/1965 | Netherlands. |
| 6,414,606 | 6/1965 | Netherlands. |

OTHER REFERENCES

Bestian et al.: Helvetica Chimica Acta, vol. 49, pp. 214–34 (January 1966), QD1H4.

HENRY R. JILES, Primary Examiner

HARRY I. MOATZ, Assistant Examiner

U.S. Cl. X.R.

260—329, 332.5, 332.2, 332.3, 293.4, 268, 326.81, 326.3, 326.5; 424—250, 267, 274, 275